United States Patent
Atungsiri et al.

(10) Patent No.: US 10,911,276 B2
(45) Date of Patent: Feb. 2, 2021

(54) TRANSMITTER, RECEIVER AND METHODS AND COMPUTER READABLE MEDIUM

(71) Applicant: Sony Corporation, Tokyo (JP)

(72) Inventors: Samuel Asangbeng Atungsiri, Basingstoke (GB); Lachlan Bruce Michael, Kowaguchi (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 15/896,512

(22) Filed: Feb. 14, 2018

(65) Prior Publication Data
US 2018/0176056 A1 Jun. 21, 2018

Related U.S. Application Data

(63) Continuation of application No. 15/403,590, filed on Jan. 11, 2017, now Pat. No. 9,954,704.

(30) Foreign Application Priority Data

Feb. 12, 2016 (GB) .................... 1602587.6

(51) Int. Cl.
*H04L 27/26* (2006.01)
*H04L 27/34* (2006.01)
*H04B 17/336* (2015.01)

(52) U.S. Cl.
CPC ....... *H04L 27/2602* (2013.01); *H04B 17/336* (2015.01); *H04L 27/2613* (2013.01);
(Continued)

(58) Field of Classification Search
CPC ............. H04L 27/2602; H04L 27/2613; H04L 27/2636; H04L 27/2646; H04L 27/3488; H04B 17/336
See application file for complete search history.

(56) References Cited

U.S. PATENT DOCUMENTS 6,868,072 B1 * 3/2005 Lin ..................... H04L 12/2803
370/276
7,388,541 B1 * 6/2008 Yang .................... G01C 21/206
342/464
(Continued)

FOREIGN PATENT DOCUMENTS

EP 1 890 447 A2 2/2008
GB 2515854 1/2015
(Continued)

OTHER PUBLICATIONS

"ATSC Candidate Standard: System Discovery and Signaling", (Doc. A/321 Part1), 2015, 20 pgs.
(Continued)

*Primary Examiner* — Jaison Joseph
(74) *Attorney, Agent, or Firm* — Obion, McClelland, Maier & Neustadt, L.L.P.

(57) ABSTRACT

A transmitter transmits payload data using Orthogonal Frequency Division Multiplexed (OFDM) symbols, the transmitter comprising frame builder circuitry configured to receive the payload data to be transmitted and to receive signalling information for use in detecting and recovering the payload data at a receiver, and to form the payload data into frames with the signalling information as a preamble to each of the frames for transmission. Modulator circuitry is configured to modulate one or more first OFDM symbols with the signalling information to form the preamble of each frame and to modulate one or more second OFDM symbols with the payload data to form post preamble waveform of each frame. Transmission circuitry is configured to transmit the one or more first OFDM symbols as a preamble and the second OFDM symbols as the post preamble waveform. The transmitter includes signature sequence circuitry configured to provide a transmitter identifier signature sequence, the transmitter identifier signature sequence being one of a set of (Continued)

Bootstrap-type TxID symbol after last frame signalling bootstrap symbol.

signature sequences to represent one of a predetermined set of identifiers which identify the transmitter to a receiver, and a combiner configured to combine the transmitter identifier signature sequence with one or more of the first OFDM symbols of the preamble or one or more additional OFDM symbols of the preamble dedicated to carry the transmitter identifier. A receiver can therefore be configured to identify the one or more of the first OFDM symbols of the preamble or one or more additional OFDM symbols of the preamble dedicated to carry the transmitter identifier, and to identify the transmitter of the received signal from the transmitter identifier sequence.

24 Claims, 17 Drawing Sheets

(52) U.S. Cl.
CPC ...... *H04L 27/2636* (2013.01); *H04L 27/2646* (2013.01); *H04L 27/3488* (2013.01)

(56) References Cited

U.S. PATENT DOCUMENTS

| | | | | |
|---|---|---|---|---|
| 8,063,825 | B1* | 11/2011 | Yang | G01S 5/0072 342/458 |
| 2003/0072255 | A1 | 4/2003 | Ma et al. | |
| 2005/0249234 | A1* | 11/2005 | Kodama | H04B 3/54 370/445 |
| 2006/0056528 | A1 | 3/2006 | Jung et al. | |
| 2010/0195712 | A1* | 8/2010 | Yu | H03M 13/2707 375/240.01 |
| 2010/0254498 | A1* | 10/2010 | Park | H04H 20/30 375/349 |
| 2011/0206137 | A1 | 8/2011 | Filippi | |
| 2011/0317780 | A1 | 12/2011 | Kang et al. | |
| 2013/0142219 | A1* | 6/2013 | Park | H04B 1/707 375/140 |
| 2014/0294124 | A1* | 10/2014 | Atungsiri | H04L 1/0017 375/340 |
| 2015/0341054 | A1* | 11/2015 | Myung | H03M 13/1102 714/776 |
| 2016/0050095 | A1 | 2/2016 | Atungsiri et al. | |
| 2016/0050097 | A1 | 2/2016 | Atungsiri | |
| 2016/0065337 | A1 | 3/2016 | Atungsiri | |
| 2016/0094895 | A1* | 3/2016 | Stadelmeier | H04H 20/59 725/33 |
| 2016/0142237 | A1 | 5/2016 | Atungsiri | |
| 2016/0235301 | A1* | 8/2016 | Melodia | G08C 23/02 |
| 2016/0373221 | A1* | 12/2016 | Michael | H04L 5/0044 |
| 2018/0359045 | A1* | 12/2018 | Park | H04J 13/10 |
| 2018/0375601 | A1* | 12/2018 | Park | H04H 20/67 |

FOREIGN PATENT DOCUMENTS

| | | |
|---|---|---|
| GB | 2532233 | 5/2016 |
| KR | 10-2015-0119760 | 10/2015 |
| KR | 20151899589 * | 12/2015 |
| KR | 20160000614 * | 1/2016 |
| WO | WO 2004/023789 A2 | 3/2004 |
| WO | WO 2006/015108 A2 | 2/2006 |
| WO | WO 2009/109883 A2 | 9/2009 |
| WO | WO 2012/176108 A1 | 12/2012 |
| WO | WO 2015/001298 A1 | 1/2015 |

OTHER PUBLICATIONS

"Digital Video Broadcasting (DVB); Frame structure channel coding and modulation for a second generation digital terrestrial television broadcasting system (DVB-T2)", ETSI EN 302 755 V1.3.1, 2012, 188 pgs.
"ATSC Candidate Standard: Physical Layer Protocol", Advanced Television Systems Committee, S32-230r30, 2016, 247 pgs.
"ATSC Standard: Physical Layer Protocol", Advance Television Systems Committee, (A/322), 2016, 6 pgs.
Internal Search Report and Written Opinion dated May 9, 2017 in PCT/GB2017/050293.
Sung Ik Park et al: "RF Watermark Backward Compatibility Tests for the ATSC Terrestrial DTV Receivers", IEEE Transactions On Broadcasting, IEEE Service Center, vol. 57, No. 2, Jun. 2011, pp. 246-252.
"ATSC Candidate Standard: System Discovery and Signaling (Doc. A/321 )", ATSC Doc. S32-231r10,Dec. 7, 2015, 28 pages.
"ATSC Candidate Standard: Physical-Layer-Protocol, (A/322)", ATSC Doc. S32-230r45, Apr. 6, 2016, 258 pages.

* cited by examiner

Frame structure for ATSC 3.0.

Bootstrap-type TxID symbol after last frame signalling bootstrap symbol.

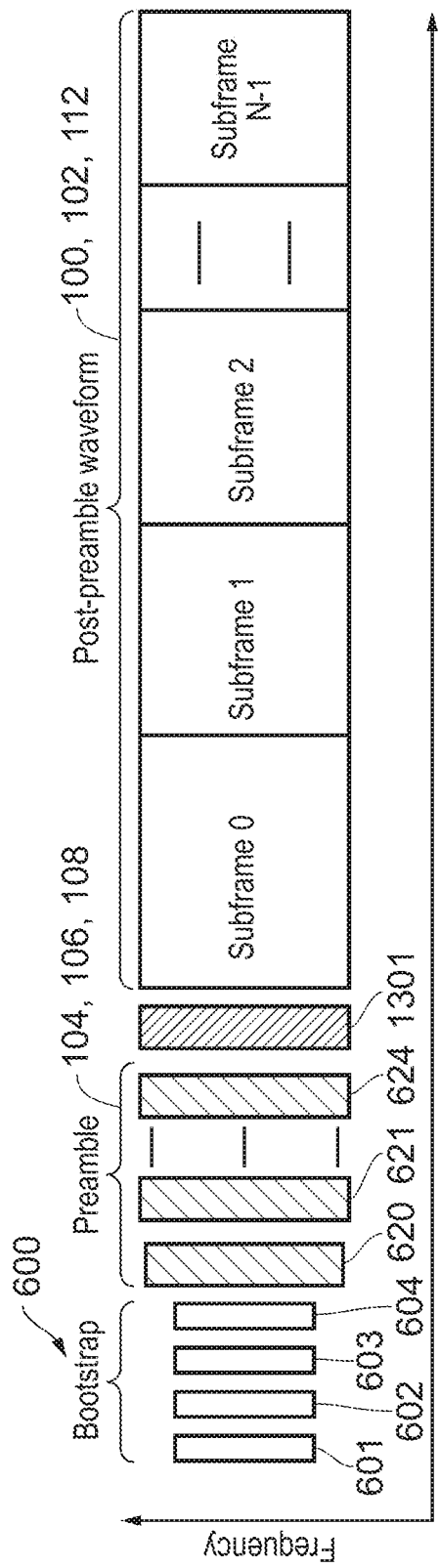
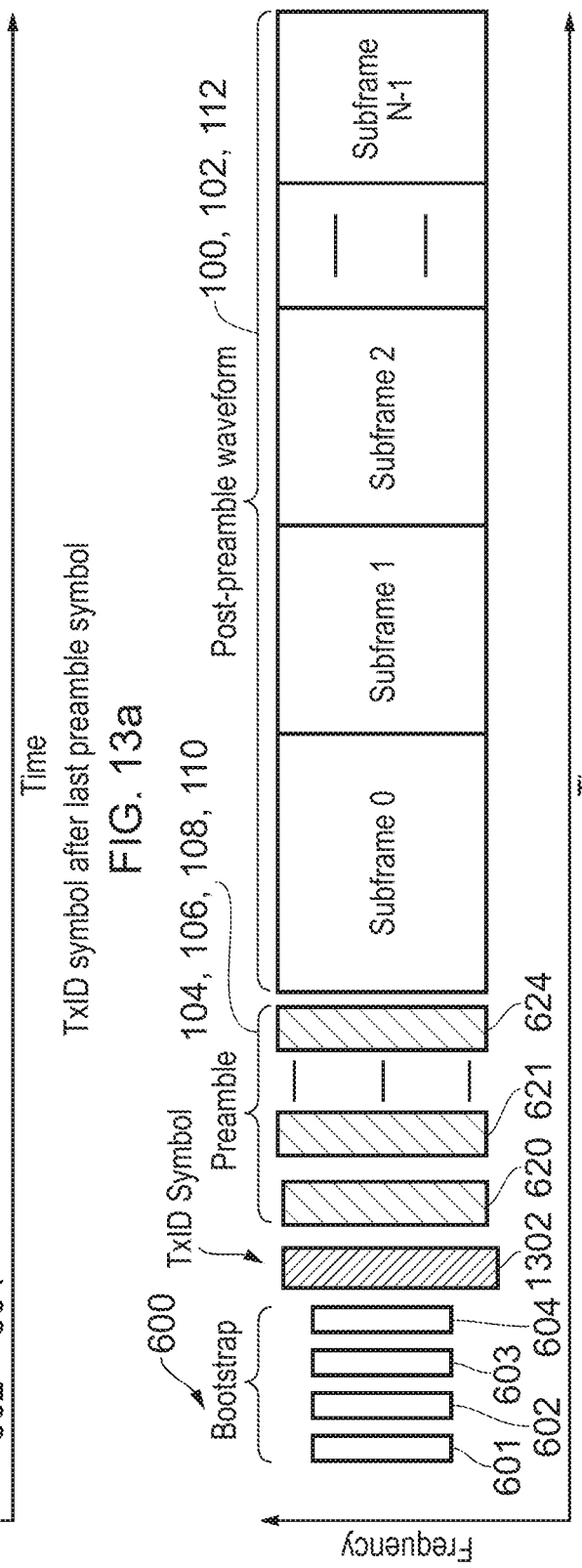
FIG. 13a
FIG. 13b

Gold sequence generator.

Detection of the first bootstrap symbol comprises frame and frequency synchronisation Estimation of relative cyclic shift in bootstrap symbol.

IFFT output for a cyclic shift of 476.

Expected IFFT output for 2x TxIDs present in the bootstrap symbol.

Detection of TxID in time domain by match filtering with time domain versions of the signature sequences.

Detection of TxID in frequency domain by matching frequency domain signature sequences.

TRANSMITTER, RECEIVER AND METHODS AND COMPUTER READABLE MEDIUM

CROSS REFERENCE TO RELATED APPLICATIONS

The present application is a continuation of U.S. application Ser. No. 15/403,590, filed Jan. 11, 2017, which claims priority to United Kingdom Application 1602587.6 filed on 12 Feb. 2016, the contents of which are incorporated herein by reference in their entirety.

FIELD OF THE DISCLOSURE

The present disclosure relates to transmitters, receivers and methods of transmitting and receiving payload data using Orthogonal Frequency Division Multiplexed (OFDM) symbols.

BACKGROUND OF THE DISCLOSURE

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K narrow band sub-carriers (where K is an integer) which are modulated in parallel, each sub-carrier communicating a modulated data symbol such as for example Quadrature Amplitude Modulated (QAM) symbol or Quaternary Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

In order to improve reception and recovery of televisions signals it can be desirable to identifier a transmitter of the television signals. This can be used to improve network planning and optimisation. Identifying a transmitter efficiently to a receiver can represent a technical problem.

SUMMARY OF THE DISCLOSURE

Various further aspects and embodiments of the disclosure are provided in the appended claims, including a transmitter for transmitting payload data and a receiver for detecting a transmitter of a received signal.

According to one example embodiment a transmitter is configured to transmit payload data using Orthogonal Frequency Division Multiplexed (OFDM) symbols. The transmitter comprises frame builder circuitry configured to receive the payload data to be transmitted and to receive signalling information for use in detecting and recovering the payload data at a receiver, and to form the payload data into frames with the signalling information as a preamble to each of the frames for transmission. Modulator circuitry is configured to modulate one or more first OFDM symbols with the signalling information to form the preamble of each frame and to modulate one or more second OFDM symbols with the payload data to form post preamble waveform of each frame. Transmission circuitry is configured to transmit the one or more first OFDM symbols as a preamble and the second OFDM symbols as the post preamble waveform. The transmitter includes signature sequence circuitry configured to provide a transmitter identifier signature sequence, the transmitter identifier signature sequence being one of a set of signature sequences to represent one of a predetermined set of identifiers which identify the transmitter to a receiver, and a combiner configured to combine the transmitter identifier signature sequence with one or more of the first OFDM symbols of the preamble or one or more additional OFDM symbols of the preamble dedicated to carry the transmitter identifier.

According to example embodiments of the present technique can therefore transmit a signal, such as a television signal, from which a receiver can identify the transmitter which transmitted the signal. The transmitter is configured to combine one or more of the first OFDM symbols of the preamble or one or more additional OFDM symbols of the preamble with a transmitter signature sequence. According to example embodiments of the present technique, a receiver can be configured to identify the one or more first OFDM symbols of the preamble or the one or more additional OFDM symbols dedicated to carry the transmitter identifier signature sequence, and to identify the transmitter of the received signal from the transmitter identifier signature sequence.

According to example embodiments of the present technique, a receiver can be configured to detect an identifier of the transmitter which transmitted the signal by detecting the signature sequence transmitted in one of the first OFDM symbols of the preamble or one of the bootstrap OFDM symbols.

The present disclosure is supported by our co-pending patent applications numbers PCT/GB2014/050869, GB1305805.2, PCT/GB2014/050868, GB1305797.1, GB1305799.7, Ser. No. 14/226,937, PCT/GB2014/050870, GB1305795.5, PCT/GB2014/050954, GB1312048.0, GB103121570, PCT/GB2014/051679, GB13170706.9, PCT/EP2014/061467, GB1403392.2, GB1405037.1, GB103121568 and PCT/GB2014/051922, GB1420117.2 the entire contents of which are incorporated herein by reference.

Various further aspects and features of the present disclosure are defined in the appended claims, which include a method of transmitting payload data, a receiver and a method of detecting and recovering payload data.

BRIEF DESCRIPTION OF THE DRAWINGS

Embodiments of the present disclosure will now be described by way of example only with reference to the accompanying drawings in which like parts are provided with corresponding reference numerals and in which FIG. 1 provides a schematic diagram illustrating an arrangement of a broadcast transmission network;

FIG. 13a is a schematic block diagram of an example embodiment of the present technique in which a transmitted television signal includes an indication of a transmitter identifier (TxID) as represented by a signature sequence which is carried by a last OFDM symbol of a preamble of a signal frame; and FIG. 13b is a schematic block diagram of an example embodiment of the present technique in which a transmitted television signal includes an indication of a transmitter identifier (TxID) as represented by a signature sequence which is carried by a first OFDM symbol of a preamble of a signal frame;

DETAILED DESCRIPTION OF EXAMPLE EMBODIMENTS

Figure 1:
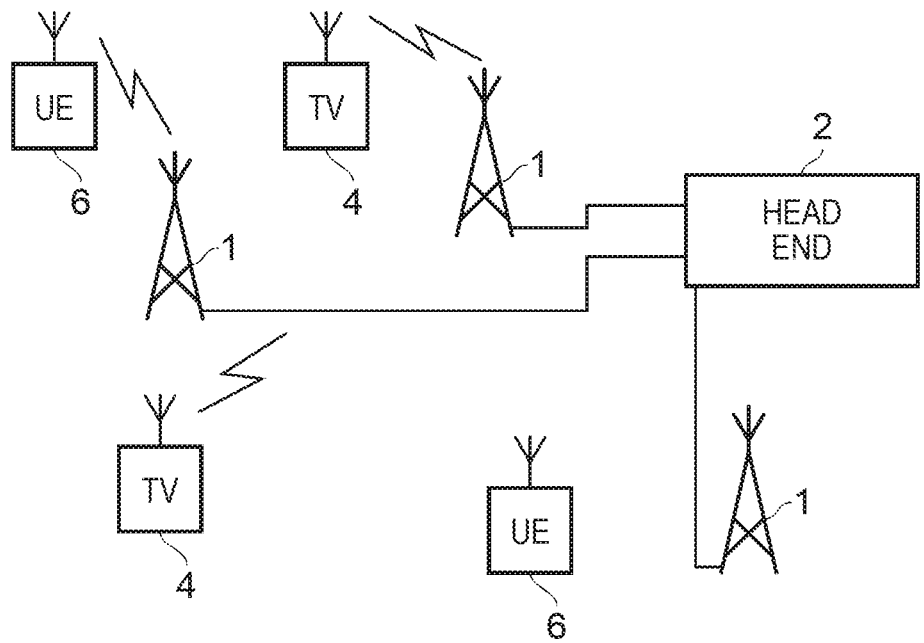

An example illustration of a television broadcast system is shown in FIG. 1. In FIG. 1 broadcast transmitters 1 are shown to be connected to a head-end or television source station 2. The broadcast transmitters 1 transmit signals from the television source station 2 within the coverage area of the broadcast network. The television broadcast network shown in FIG. 1 may operate as a so called multi-frequency network where each television broadcast transmitter 1 transmits its signal on a different frequency than other neighbouring television broadcast transmitters 1. The television broadcast network shown in FIG. 1 may also operate as a so called single frequency network in which each of the television broadcast transmitters 1 transmits the radio signals conveying audio/video data contemporaneously so that these can be received by television receivers 4 as well as mobile devices 6 within the coverage area of the broadcast network. For the example shown in FIG. 1 the signals transmitted by the broadcast transmitters 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast transmitters 1 is such that the propagation time between the signals transmitted by different broadcast transmitters 1 is less than or does not substantially exceed a guard interval that precedes the transmission of each of the OFDM symbols, then a receiver device 4, 6 can receive the OFDM symbols and recover data from the OFDM symbols in a way which combines the signals transmitted from the different broadcast transmitters 1. Examples of standards for broadcast networks that employ OFDM in this way include DVB-T, DVB-T2, ISDB-T and ATSC3.0.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Embodiments of the present technique can provide an arrangement for identifying a broadcast transmitter from which a television signal was transmitted from the television signal received at the receiver. As explained for the example television network represented by FIG. 1, modern television networks deploy single frequency networks (SFN) in order to maximize coverage and spectral efficiency. In an SFN all the broadcast transmitters 1 transmit the same programmes using the same transmission frequency. A received signal power at any location within the coverage area of the network is thus typically contributed by more than one broadcast transmitter 1. Receivers 4 located in such areas where the power is contributed by more than one broadcast transmitters 1 see the contribution of the other broadcast transmitters as multipath. With OFDM, such multipath can be exploited as spatial diversity to improve coverage, which is the so called SFN combining gain.

In such networks, it is often necessary to have the ability to identify exactly which broadcast transmitters 1 are contributing to the power flux density observed at a particular location within the coverage area of the DTTV system. Embodiments of the present technique can provide an arrangement in which a television signal is adapted at the broadcast transmitter to include signalling information, which can include an identifier of the transmitting base station which transmitted the television signal. Transmitter identification information or TxID is needed only intermittently so its presence must be signalled to receivers 4 some how. When it is not needed, it is turned off in order to conserve network resources such as transmission power and/or capacity.

The ability to identify transmitters is important for various reasons:

Receiving antennas can be orientated towards broadcast transmitters 1 that together provide the most stable signal. For example, receivers in SFN networks can sometimes suffer from self-interference between near broadcast transmitters and a very far broadcast transmitters which together present a multipath delay spread which is significantly longer than the receiver and guard interval can cope with. If such broadcast transmitters are identified, the receiving antenna can be oriented to minimize the effect of such excessive delay spreads.

SFN broadcast transmitters have to be accurately synchronised to each other both in time and in frequency. A broadcast transmitter that suffers a drift in either of its time or frequency synchronisation will cause interference within the network. The ability to quickly identify the offending broadcast transmitter is a vital precursor to correcting the drift.

In network design, the network operator may want to point the energy of a broadcast transmitter mostly in a particular direction. This is done by phasing of the broadcast transmitter antenna elements. During this phasing, transmitter identification is used to ensure that power from a particular broadcast transmitter is not unduly seen at locations where it should not be.

Given that a receiver can identify all broadcast transmitters from which it receives a signal, the receiver can cross reference the TxIDs with a database of broadcast transmitter locations to ascertain the exact coordinates of the broadcast transmitters. If a receiver also knows the time at which the signal was emitted from the transmitter, it can estimate the propagation time between itself and each transmitting base station since it can derive the time of arrival of the signal from each broadcast transmitter. With propagation time estimates and coordinates of three or more transmitting base stations, the receiver can use triangulation to derive a good estimate of its position. This ability would be very useful especially to mobile receivers.

Transmitter identification is also useful in multi-frequency networks (MFN) for similar purposes.

Example embodiments of the present technique, can provide an arrangement for transmitting a transmitter identifier (TxID) as signalling information according to examples in which A fifth bootstrap symbol is added to carry the TxID. Since all transmitters would use this symbol for TxID signalling, embodiments of the present technique can include special receiver algorithms to detect the TxIDs.

A specially designed OFDM symbol carries a signature sequence, such as a Gold sequence=modulated Zadoff-Chu sequence, wherein the choice of sequence used signals the TxID of the broadcast transmitter. This has the advantage that it can also provide to the receiver the channel impulse response and time of arrival (ToA) at the receiver of the signal from each broadcast transmitter.

Other embodiments of the present technique can provide an arrangement in a receiver for locating the TxID symbol.

The following sections describe a transmitter and receiver arrangement for transmitting and receiving a television signal with which the example embodiments find application.

Transmitter

Figure 2:
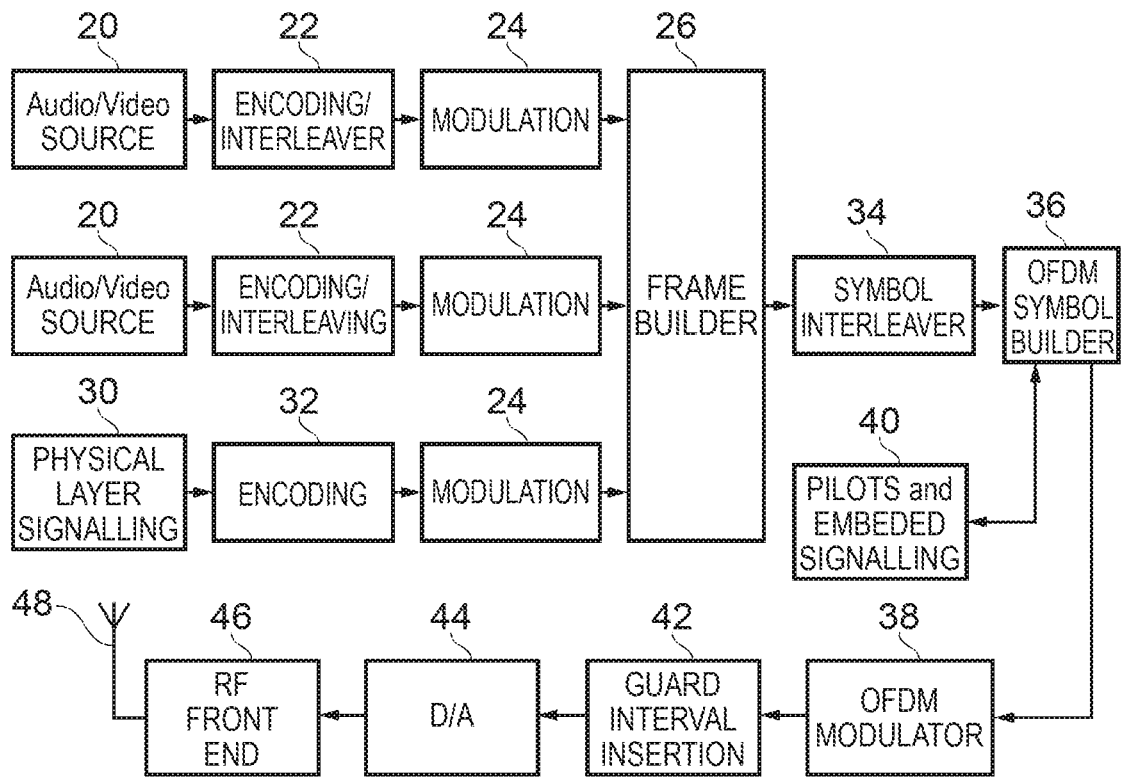
FIG. 2 provides a schematic block diagram illustrating an example transmission chain for transmitting broadcast data via the transmission network of FIG. 1.

An example block diagram of a transmitter forming part of the television broadcast transmitters 1 for transmitting data from audio/video sources is shown in FIG. 2. In FIG. 2 audio/video sources 20 generate the audio/video data representing television programmes. The audio/video data is encoded using forward error correction encoding by an encoding/interleaver block 22 which applies forward error correction to encode the data which is then fed to a modulation unit 24 which maps the encoded data onto modulation symbols which are used to modulate OFDM symbols. Depicted on a separate lower arm, signalling information providing physical layer signalling for indicating for example the format of coding and modulation of the audio/video data is generated by a physical layer signalling unit 30 and after being encoded by an encoding unit 32, the physical layer signalling information is then modulated by a modulation unit 24 as with the audio/video data.

A frame builder 26 is arranged to form the data to be transmitted with the physical layer signalling information into a frame for transmission. The frame includes a time divided section having a preamble in which the physical layer signalling is transmitted and one or more data transmission sections which transmit the audio/video data generated by the audio/video sources 20. An interleaver 34 may interleave the data which is formed into symbols for transmission by an OFDM symbol builder 36 and an OFDM modulator 38. The OFDM symbol builder 36 receives pilot signals which are generated by a pilot and embedded data generator 40 and fed to the OFDM symbol builder 36 for transmission. The output of the OFDM modulator 38 is passed to a guard insertion unit 42 which inserts a guard interval and the resulting signal is fed to a digital to analogue convertor 44 and then to an RF front end 46 before being transmitted by an antenna 48.

Figure 3:
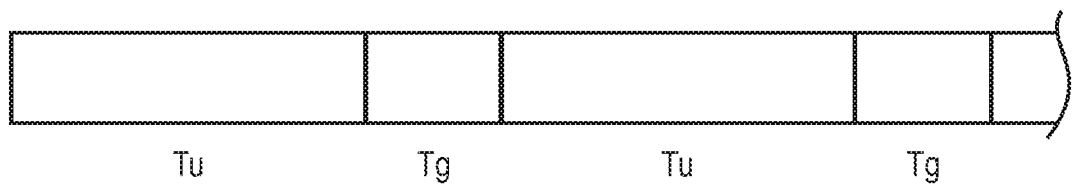
FIG. 3 provides a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform which may comprise part of the OFDM modulator 38. Thus the data to be transmitted is formed in the frequency domain and transmitted in the time domain. As shown in FIG. 3 each time domain symbol is generated with a useful part of duration Tu seconds and a guard interval of duration Tg seconds. The guard interval is generated by copying a part of the useful part of the symbol with duration Tg in the time domain, where the copied part may be from an end portion of the symbol. By correlating the useful part of the time domain symbol with the guard interval, a receiver can be arranged to detect the start of the useful part of the OFDM symbol which can be used to trigger a Fast Fourier Transform to convert the time domain symbol samples into the frequency domain from which the transmitted data can then be recovered. Such a receiver is shown in FIG. 4.

Figure 4:
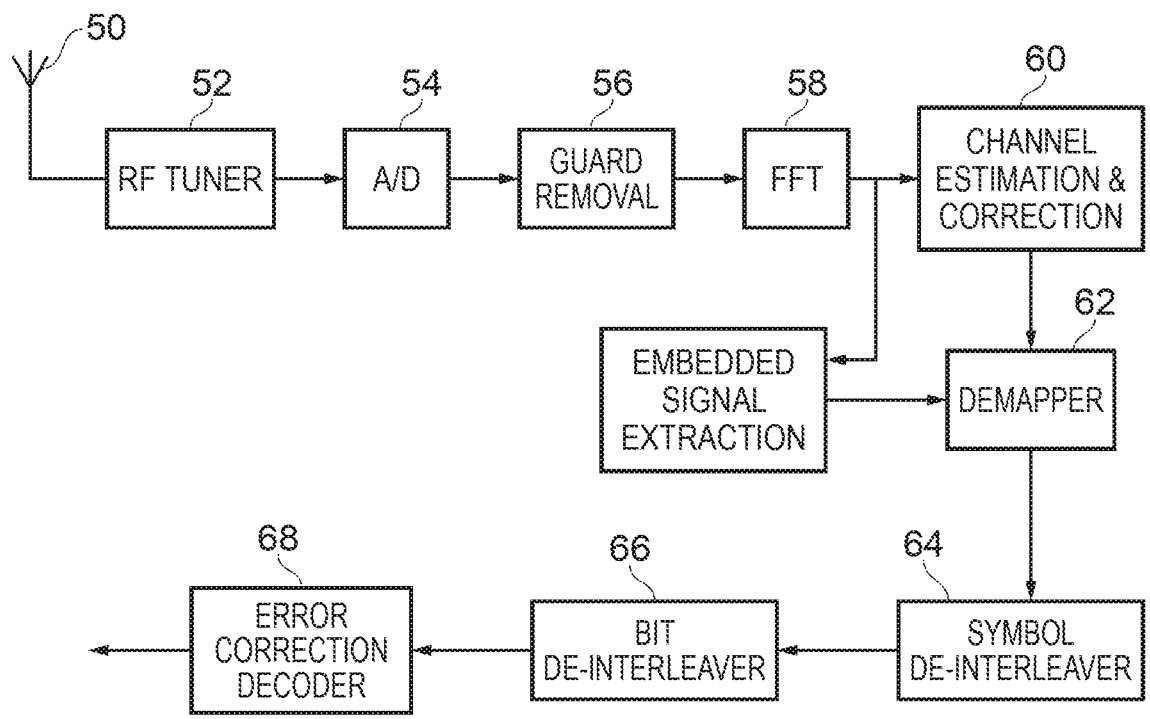
FIG. 4 provides a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 estimates the transmission channel used for equalisation for example by using pilot sub-carriers which have been embedded into the OFDM symbols. After excluding the pilot sub-carriers, all the data-bearing sub-carriers are fed to a de-mapper unit 62 which extracts the data bits from the sub-carriers of the OFDM symbol. These data bits are then fed to a de-interleaver 64 which de-interleaves the sub-carrier symbols. The data bits are now fed to a bit de-interleaver 66, which performs the de-interleaving so that the error correction decoder can correct errors in accordance with a conventional operation.

Framing Structure

Figure 5:
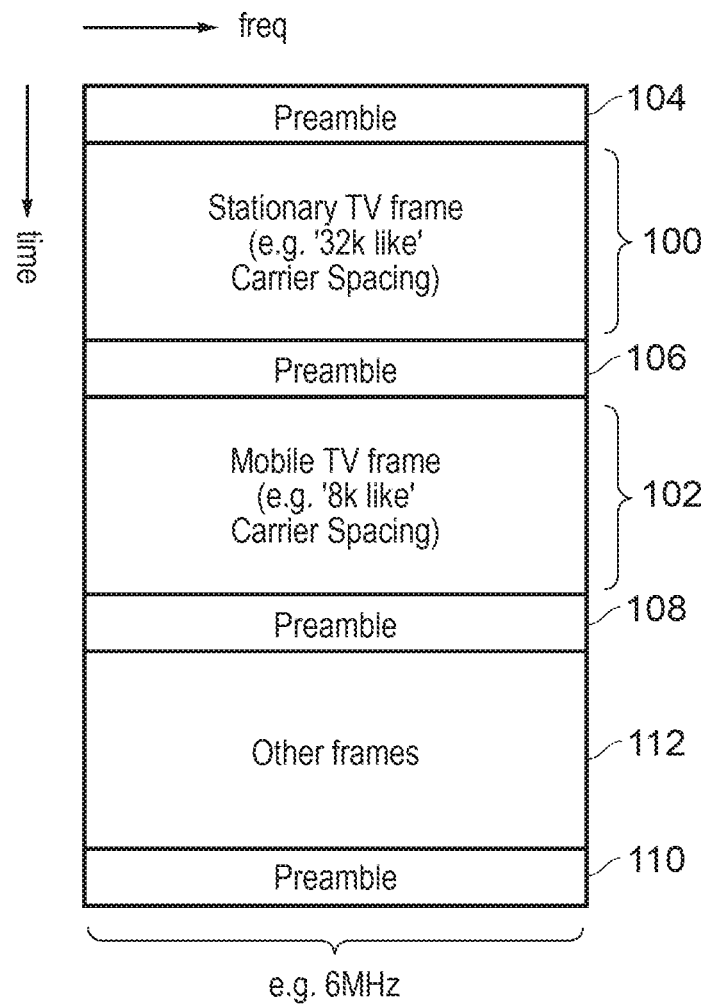
FIG. 5 provides a schematic illustration of a sequence of transmission frames for transmitting broadcast data and payload data separated by a preamble carrying signalling information.

FIG. 5 shows a schematic diagram of the framing structure of a frame that may be transmitted and received in the systems described with reference to FIGS. 1 to 4. FIG. 5 illustrates different physical layer frames, 100, 102, 112 some targeted for mobile reception whilst others are targeted for fixed roof-top antenna reception.

The framing structure shown in FIG. 5 is therefore characterised by frames which may each include payload data modulated and encoded using different parameters. This may include for example using different OFDM symbol types having different number of sub-carriers per symbol, which may be modulated using different modulation schemes, because different frames may be provided for different types of receivers. However each frame may include at least one OFDM symbol carrying signalling information, which may have been modulated differently to the one or more OFDM symbols carrying the payload data. Furthermore for each frame, the signalling OFDM symbol may be a different type to the OFDM symbol(s) carrying the payload data. The signalling information is required to be recovered so that the payload data may be de-modulated and decoded.

Bootstrap Signal

Figure 6:
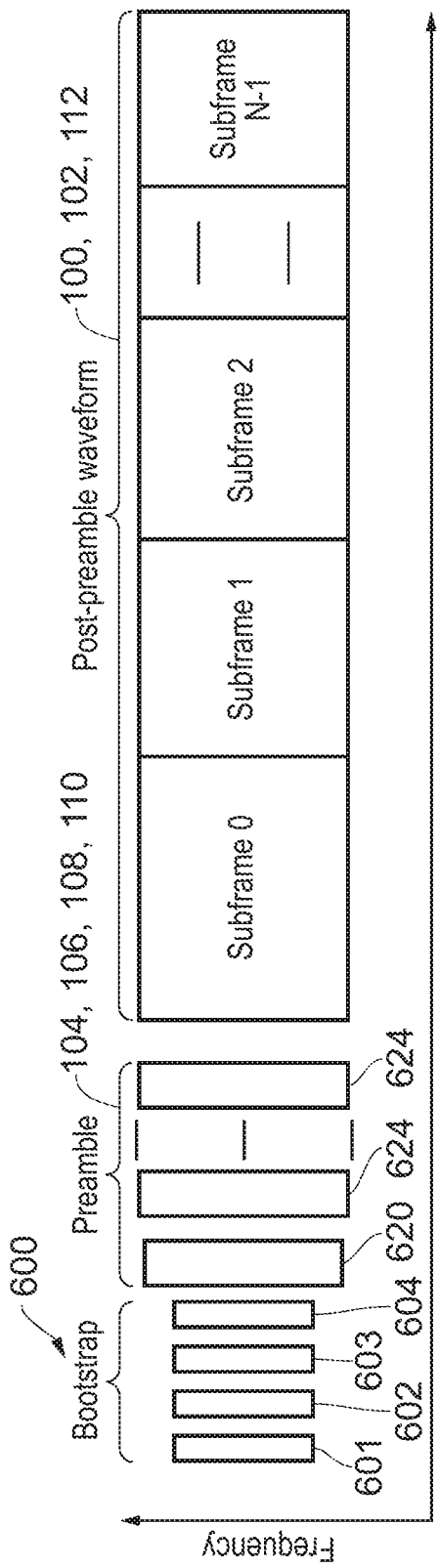
FIG. 6 provides a schematic representation of a preamble of one of the transmission frames shown in FIG. 5, which includes a so-called "bootstrap" signal or waveform comprised of multiple OFDM symbols.

As explained in [1], the bootstrap signal provides a universal entry point into an ATSC waveform. The bootstrap signal has a known configuration in that the sampling rate, the signal bandwidth, the sub carrier spacing and time domain structure are known a priori at the receivers. FIG. 6 provides a schematic representation of the form of an adopted frame structure of an ATSC 3.0 physical layer frame, which includes a bootstrap signal, with respect to the data carrying frames shown in FIG. 5. A frame can have duration as long as 5 seconds and is comprised of:

- A bootstrap composed of four short OFDM symbols carrying the basic system acquisition signalling in a very robust way. The phase of the last bootstrap symbol is inverted as an indication that this is the last bootstrap symbol.
- A preamble which is comprised of one or more OFDM symbols and carries the physical layer (L1) signalling that comprises the post-preamble waveform parameters and payload access parameters for all the sub-frames of the frame.
- The post-preamble waveform comprises a signalled number of sub-frames. Each sub-frame carries the payload that comprises the services partitioned into physical layer pipes or PLPs. Each sub-frame is comprised of a signalled number of OFDM symbols of a particular FFT size, guard interval and scattered pilot pattern. FFT sizes can differ between sub-frames.

The bootstrap carries signalling including some about the structure of the first preamble symbol of the frame. This first preamble symbol carries signalling about the structure of the rest of the signalling information carried in the rest of the preamble symbols.

As shown in FIG. 6 the bootstrap signal 600, which may form part of the preamble 104, 106, 108, 110, precedes a data-bearing frame 100, 102, 112. As indicated above, the bootstrap signal comprises four or more OFDM symbols 601, 602, 603, 604 beginning with a synchronisation symbol 601 positioned at the start of each frame to enable service discovery, coarse time synchronisation, frequency offset estimation and initial channel estimation. The remaining other bootstrap OFDM symbols 602, 603, 604 contain sufficient control signalling to provide communications parameters to allow the received signal to be decoded for the remaining part of the frame. Thus the bootstrap signal 600 carries signalling information to enable a receiver to discover the parameters with which the data-bearing frame has been configured so that a receiver can detect and recover this data. As will be explained shortly, according to an example embodiment of the present technique, the signalling information may in one example provide an indication of a TxID.

Bootstrap Signal Encoding

Figure 7:
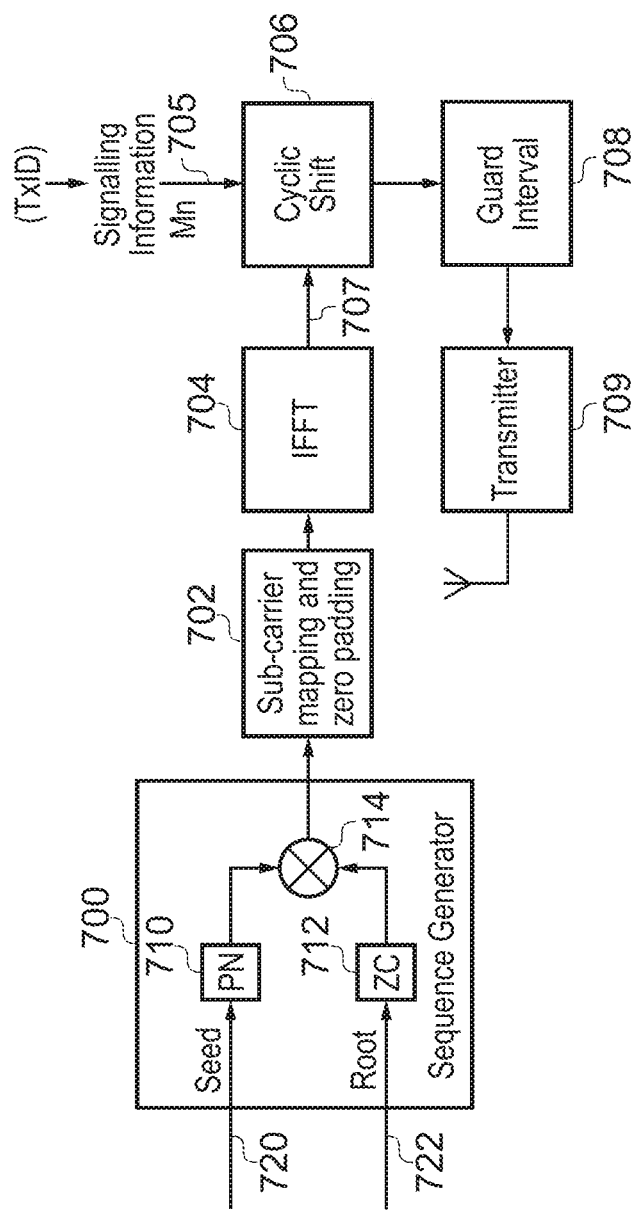
FIG. 7 provides a schematic block diagram of a part of the transmitter shown in FIG. 2 for transmitting a bootstrap signal comprising a plurality of bootstrap, OFDM symbols.

A schematic block diagram of a part of the transmitter shown in FIG. 2 which is configured to transmit a bootstrap signal 600 is shown in FIG. 7. In FIG. 7 a signature sequence generator 700 is arranged to generate a signature sequence which is mapped onto the sub carriers of an OFDM symbol forming the bootstrap symbol 600 by the sub carrier mapping and zero padding unit 702. The frequency domain signal is then transformed into the time domain by an inverse Fourier transform 704. Signalling information which is to be transmitted with the bootstrap signal is fed on a first input 705 to a cyclic shift unit 706. The cyclic shift unit 706 also receives on a second input 707 the time domain OFDM representing the bootstrap symbol. As will be explained below, an amount of cyclic shift of the bootstrap OFDM symbol in accordance with the signalling information is applied to the bootstrap OFDM symbol in the time domain and in one example embodiment the TxID of the broadcast transmitter determines this amount of cyclic shift. Thus the bootstrap symbol carries signalling information via the amount of cyclic shift applied to it. The cyclically shifted bootstrap OFDM symbol is then fed to a guard interval insertion unit 708, which adds a guard interval to the bootstrap OFDM symbol in the form in which the OFDM symbol forming of the bootstrap symbol will be transmitted by a transmitter unit 709.

As shown in FIG. 7 the signature sequence generator 700 generates a signature sequence comprising a pseudo random sequence generator 710 and a Zadoff-Chu sequence generator 712. These two sequences are multiplied together by a multiplier 714 before the combined sequences are mapped onto the sub carriers of the OFDM symbol by the sub carrier mapping and zero padding unit 702. As shown in FIG. 7 the seed value for the pseudo random number generator 710 is fed on a first input 720 and a second input 722 provides an indication of the root of the Zadoff-Chu sequence generator 712.

Figure 8:
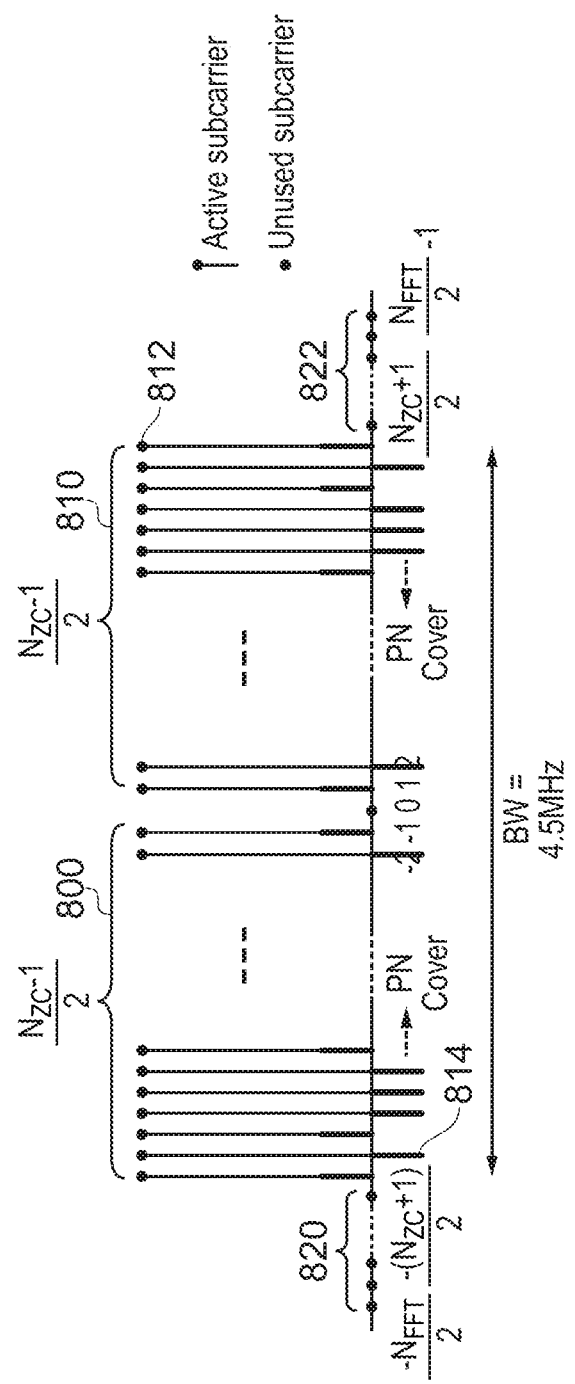
FIG. 8 provides a schematic representation of a bootstrap OFDM symbol in the frequency domain.

The mapping of the Zadoff-Chu (ZC) sequence modulated by a pseudo random bipolar sequence to form the signature sequence onto the OFDM symbol in a symmetrical way is shown in FIG. 8.

As shown in FIG. 8, in the frequency domain, the bootstrap signal can be regarded as comprising two halves 810 of a symmetrical Zadoff-Chu (ZC) sequence. Each symbol in the Zadoff-Chu sequence is arranged to modulate an active carrier 812. Correspondingly the PN sequence is arranged to modulate the sub-carriers as shown by the lines 814. Other sub carriers of the bootstrap symbol are not used and so are set to zero as shown for example at either end of the bootstrap signal 820, 822.

As shown in FIG. 8 the ZC sequence and the PN sequence are mapped to the OFDM sub-carriers in a manner that produces a reflective symmetry about the central DC sub carrier of the OFDM symbol. The subcarrier values for the n-th symbol of the bootstrap ($0 \leq n < N_B$) may be calculated as in the following equation, where $N_H = (N_{ZC}-1)/2$, $N_B$ is the number of bootstrap symbols and p(k) are elements of the PN-sequence. The ZC sequence determined by its root q, may be the same for each symbol, while the PN sequence shall advance with each symbol.

$$s_n(k) = \begin{cases} z_q(k+N_H) \times c((n+1) \times N_H + k) & -N_H \leq k \leq -1 \\ z_q(k+N_H) \times c((n+1) \times N_H - k) & 1 \leq k \leq N_H \\ 0 & \text{otherwise} \end{cases}$$

-continued
$$c(k) = 1 - 2 \times p(k) \text{ with } c(k) \text{ having either the value } +1 \text{ or } -1.$$

The final bootstrap symbol is inverted in phase (i.e. a rotation of 180°) of the subcarrier values for that particular symbol. This provides an indication of the definite end of the bootstrap signal. This is provided in case there are further bootstrap OFDM symbols, in which case a receiver is provided with a definite indication of the last bootstrap OFDM symbol. That is to say any number of bootstrap OFDM symbols may be used. Accordingly, receivers can detect the phase inversion and so detect the end of the bootstrap signal.

$$\tilde{s}_n(k) = \begin{cases} s_n(k) & 0 \leq n < N_B - 1 \\ -s_n(k) & n = N_B - 1 \end{cases}$$

In one example, signalling information can be conveyed in the bootstrap signal by performing a data-determined cyclic shift of the symbol in the time domain. This is performed by the cyclic shift blocks shown in FIG. 7. The process for conveying signalling bits is summarised in FIG. 9.

Figure 9:
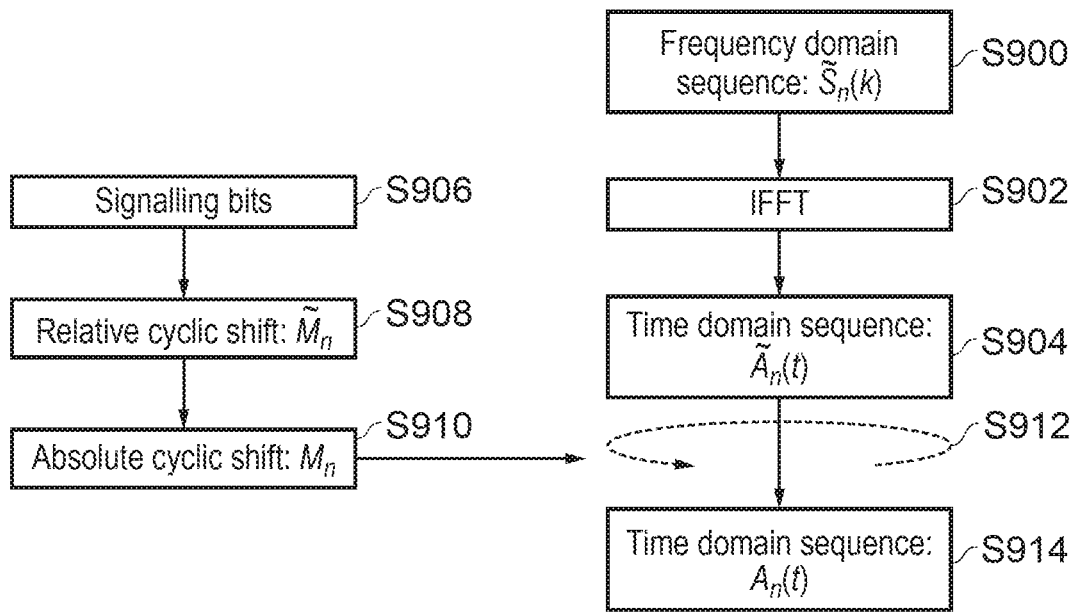
FIG. 9 is an illustrative flow diagram representing the operation of the transmitter in imprinting the signalling information, which is transported on one or more of the bootstrap OFDM symbols by cyclically shifting the time domain symbol sequence.

In FIG. 9 the signature sequence is formed by the sequence generator 700 in the frequency domain in step S900. In step S902 an inverse Fourier transform is performed by the IFFT module 704 to convert the frequency domain signal into the time domain. Thus in step S904 the sequence is formed in the time domain. As shown in step S906 the signalling bits are formed and then interpreted in step S908 as a cyclic shift value relative to the cyclic shift of the previous bootstrap symbol and in step S910 the relative shift value is converted to an absolute shift value. In one embodiment, the first bootstrap symbol is not cyclic shifted i.e. the amount of its relative cyclic shift is zero. As shown by arrow S912 the time domain sequence formed in step S904 is then shifted in accordance with the absolute cyclic shift determined in step S910. Finally, in step S914 the time domain sequence to be transmitted is produced.

Time Domain Structure

Figure 10:
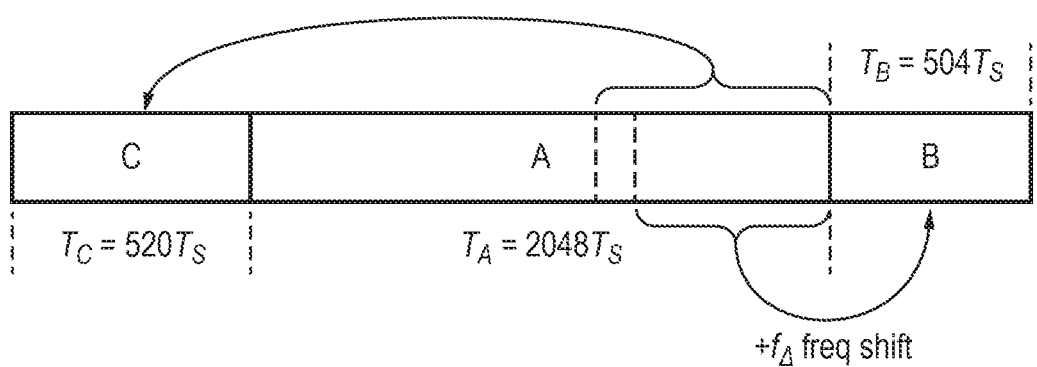
FIG. 10 provides a schematic representation of a time domain structure of a first of the bootstrap OFDM symbols.
Figure 11:
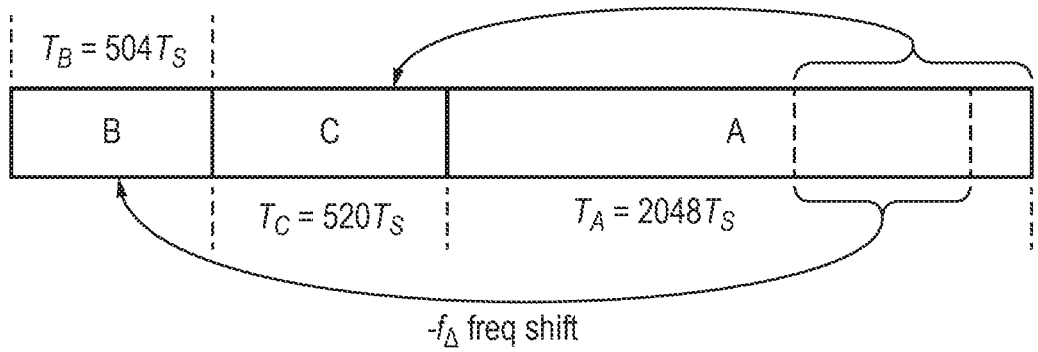
FIG. 11 provides a schematic representation of a second time domain structure of one or more other bootstrap OFDM symbols.

Each of the bootstrap OFDM symbols 601, 602, 603, 604 can be interpreted as being comprised of three parts which are referred to as A, B and C. As explained above, an OFDM symbol is usually formed with a guard interval generated by copying a section of the OFDM symbol in the time domain as a preamble to the OFDM symbol in order to account for multi path reception at the receiver. Each bootstrap symbol is formed in one of two ways. The different formation of the bootstrap symbols in the time domain is shown in FIGS. 10 and 11. As shown in both FIGS. 10 and 11 the data carrying part of the symbol that is the original formation of the OFDM symbol before guard intervals are added is represented as section A. Thus, section A is derived as the IFFT of the frequency domain structure with or without the cyclic shift explained above to represent the signalling bits being conveyed by the bootstrap symbol. Parts B and C are composed of samples taken from the end of A with a frequency shift of $\pm f_A$ which is equal to the sub carrier spacing introduced into the samples of B by the transmitter, and correspondingly removed at the receiver. Each bootstrap symbol consistently consists of 3072 samples.

There are two variations of the time domain structure of the bootstrap symbols which are referred to as C-A-B and B-C-A. The initial symbol of the bootstrap referred to as bootstrap symbol zero is provided for synchronisation detection and employs the C-A-B structure which is shown in FIG. 10 and applies a frequency shift of $+f_A$ to part B. The remaining bootstrap symbols use the B-C-A structure including the final bootstrap symbol with a phase inversion which provides the termination of the bootstrap signal as explained above and applies a frequency shift of $-f_A$ to part B.

Bootstrap Based TxID

Figure 12:
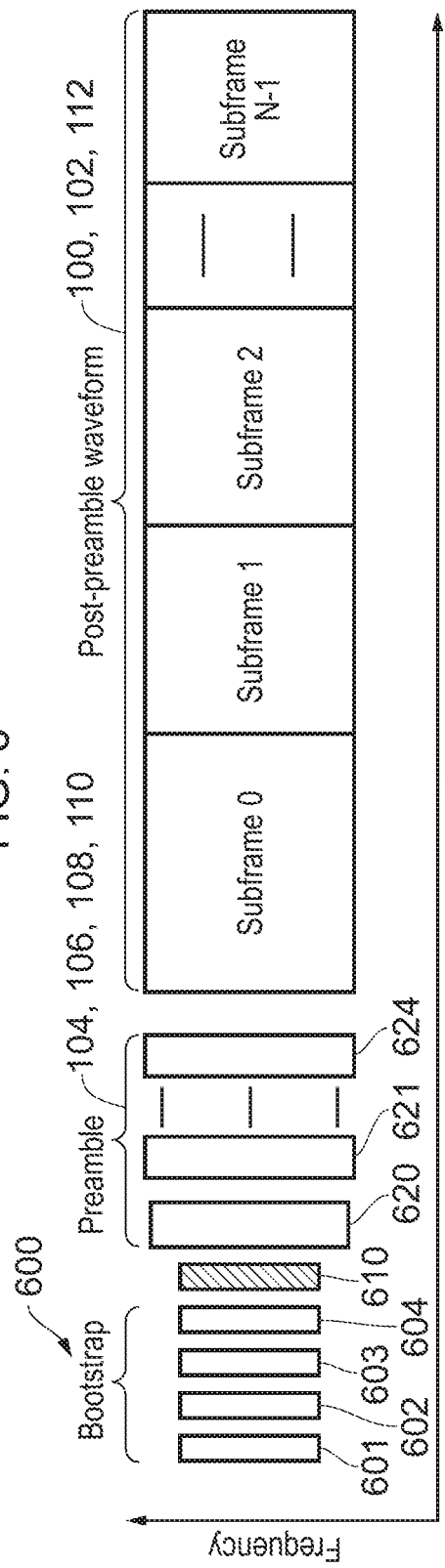
FIG. 12 is a schematic block diagram of an example embodiment of the present technique in which a transmitted television signal includes an indication of a transmitter identifier (TxID) carried by a bootstrap OFDM symbol forming part of a bootstrap signal.

According to an example embodiment of the present technique, an additional bootstrap symbol is introduced which is configured to carry the TxID. An example configuration of the bootstrap signal according to an example embodiment is shown in FIG. 12. As shown in FIG. 12, the additional bootstrap symbol 610 is transmitted between the fourth bootstrap 604 and the first preamble symbol 620. This fifth bootstrap symbol 610 is constructed in the same manner as the second and third bootstrap symbols 602, 603, using the same ZC and PN-sequences as the existing bootstrap symbols 601, 602, 603, 604. Its existence is signalled by re-inverting the phase of the fourth bootstrap symbol 604 and inverting the phase of this fifth TxID bootstrap symbol 610 to signal that it is now the last bootstrap symbol.

Assuming that it is necessary to identify not more than 256 different TxIDs, then this TxID bootstrap symbol should carry up to an 8-bit value of the identity of the transmitter. This signalling information is encoded and carried by the extra bootstrap symbol 610 in the same manner as signalling information is carried generally by the other bootstrap symbols[1] 602, 603, 604.

In another embodiment, more than one TxID bootstrap symbol 610 can be added if for example, there is need to signal more than 256 TxID values in a given network. In this example embodiment, only the last TxID bootstrap symbol will have an inverted phase to indicate the end of TxID bootstrap signalling, so that the phases of all the other TxID bootstrap symbols would not be inverted. In this example embodiment, the first TxID bootstrap symbol 610 would carry the 8 most significant bits of the TxID, the second TxID bootstrap symbol would carry the next 8 most significant bits of the TxID and so on. Thus with m TxID bootstrap symbols, each TxID can be up to 8 m bits wide and so up to $2^{8m}$ TxIDs can be signalled.

In another embodiment, each TxID bootstrap symbol can be made to carry less than 8 bits.

Special or Additional OFDM Symbol Based TxID

According to another example embodiment an OFDM symbol is constructed to convey the TxID, which is illustrated in FIGS. 13a and 13b, which corresponds to the representation of the frame structure for ATSC 3.0 shown in FIG. 6 but has been adapted to include a special or additional OFDM symbol 1301, which may be dedicated to convey the TxID or may be arranged to carry the TxID in addition to signalling information for detecting the payload data from the frames 100, 102, 112. For the example shown in FIG. 13a, this OFDM symbol 1301 is the last of the OFDM symbols 620, 621, 624 forming part of the preamble 104, 106, 108, 110 of the frame structure. In another example shown in FIG. 13b, the special or additional OFDM symbols 1302 is the first of the OFDM symbols 620, 621, 624 carrying signalling information for detecting the frames 100, 102, 112 or may be dedicated to only carry the TxID.

Figure 14:
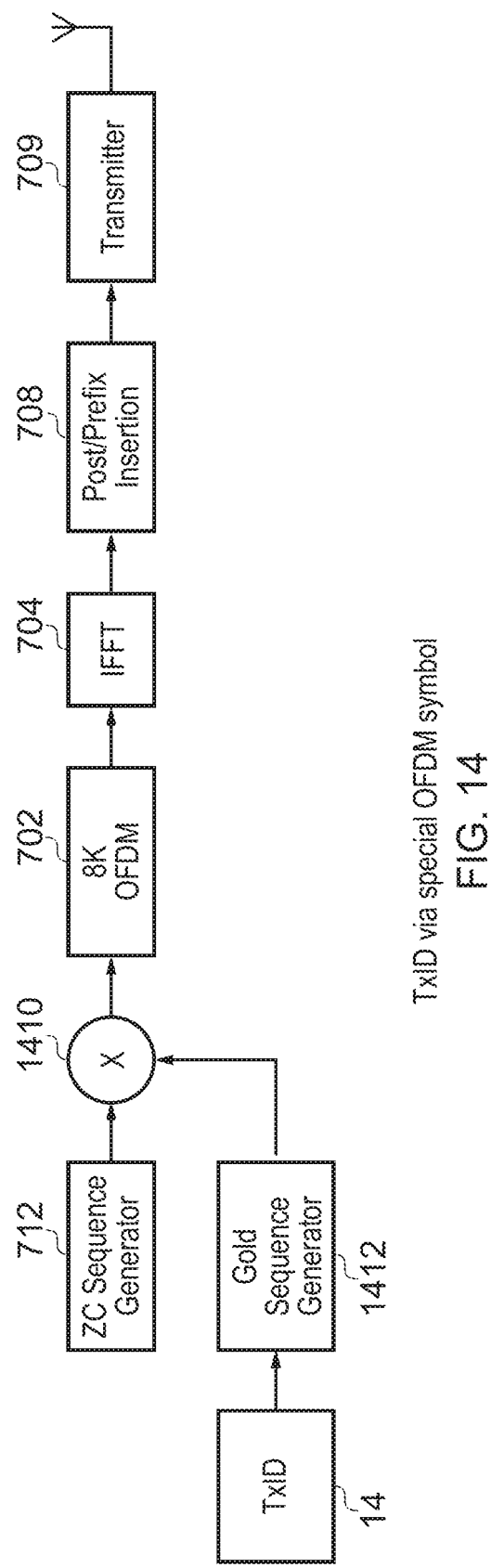
FIG. 14 is a schematic block diagram representing parts of a transmitter which transmits a television signal and illustrates the generation of an OFDM symbol carrying a signature sequence which represents a transmitter identifier.

FIG. 14 provides an illustrative block diagram of elements forming parts of the transmitter shown in FIG. 2, which are adapted to generate the additional OFDM symbol 1301, 1302 which carries signalling information forming part of the TxID. The transmitter shown in FIG. 14 corresponds substantially to the parts of the transmitter shown in FIG. 7 and so corresponding parts have the same numerical references. As shown in FIG. 14 a signature sequence is generated by a Zadoff-Chu (ZC) sequence 712, a multiplier 1410 and a Gold sequence generator 1412. As shown in FIG. 14, the signature sequence is generated from the dot product, formed by the multiplier 1410, of a bipolar Gold sequence generated by the Gold sequence generator 142 and a CAZAC or Zadoff-Chu (ZC) sequence generated by the ZC generator 1412. The combined sequence is referred to as a (ZC*GS) signature sequence. The TxID for the particular transmitter, fed from the TxID generator 1414, is conveyed in the choice of the Gold sequence. A selection signal fed from the TxID generator 1414 selects the Gold sequence in the Gold sequence generator 1412 which is used to generate the (ZC*GS) signature sequence. The signature sequence is then used to modulate an OFDM symbol 1301 forming the last OFDM symbol of the preamble. This OFDM symbol therefore represents the TxID from the particular Gold sequence selected by the TxID generator.

As illustrated by FIGS. 13a and 13b, the TxID OFDM symbol can be located in one of two locations in the frame:
Immediately following the last frame signalling bootstrap symbol in the manner shown in FIG. 13b. In this case, its existence is signalled by the re-invertion of the phase of the last frame signalling bootstrap symbol 604. Further, the waveform parameters of this symbol are the same as the first preamble symbol waveform structure signalled via the bootstrap symbols.
Immediately following the last preamble symbol 604 as shown in FIG. 13a. In this case, its existence and waveform structure are signalled in the L1 signalling carried by the preamble.

As indicated above, in some examples the TxID or (ZC*GS) signature sequence can be superposed on one of the preamble symbols 620, 621, 624 with a suitable injection level G such that the TxID OFDM symbol contributes power proportion Q whilst the preamble symbol contributes (1−Q) as disclosed in our co-pending patent application number WO2014/155104 where Q<(1−Q) and Q is very close to zero.

The TxID symbol waveform parameters (FFT size, guard interval and baseband sampling rate) are similar to those which form the other preamble symbols 620, 621, 624. Therefore, as with other preamble symbols 620, 621, 624, the TxID symbol can have any FFT size (8K, 16K and 32K), any allowed number of active carriers (NoC) from Table 7.1 of [4] and the same guard interval duration as the preamble symbols. In the general embodiment, the desirable NoC are the lowest values of {6529, 13057, 26113} for 8K, 16K and 32K FFT sizes respectively.

In one embodiment an 8K symbol may be selected because this provides a balanced selection between a loss in payload capacity arising from including an extra OFDM symbol carrying the TxID and the length of the signature sequence. The signature sequence has to be long enough to provide a wide dynamic range to the TxID detector. The use of the TxID OFDM symbol has the following advantages:
The long sequence (6529 chips long) used in its construction results in a wide dynamic range for the detector. This means that a transmitter whose signal is very weak at the location of the detector can still be detected.
The autocorrelation properties of the underlying ZC sequence improve TxID detection performance but also enable the accurate estimation of the channel impulse response due to the given transmitter.

In the embodiments where this TxID OFDM symbol is orthogonal in time (not superposed on other signals such as for example the dedicated additional OFDM symbols 1301, 1302), its detection can quite easily be made in the presence of frequency and timing offsets. This allows flexibility in the functioning of detectors—either in the frequency or time domains, with or without accurate frequency offset correction etc. It also follows that a stand-alone TxID detector can work without the need for prior frame synchronization.

The cross-correlation properties of the (ZC*GS) signatures improves the isolation of different TxIDs at the receiver.

As mentioned above, the (ZC*GS) signature sequence for each TxID is a dot product between a Gold sequence and a ZC sequence. A Gold sequence comprises of two pseudo-random binary sequences (PRBS) XOR'ed together. The PRBS sequences are generated using the generator polynomials below. The generator can be realized using the feedback shift register circuit illustrated in FIG. 15.

$$g_1(x)x^{16}+x^{10}+x^9+x^7+x^6+x+1$$

$$g_2(x)=x^{16}+x^{14}+x^9+x^6+x^3+x+1$$

Figure 15:
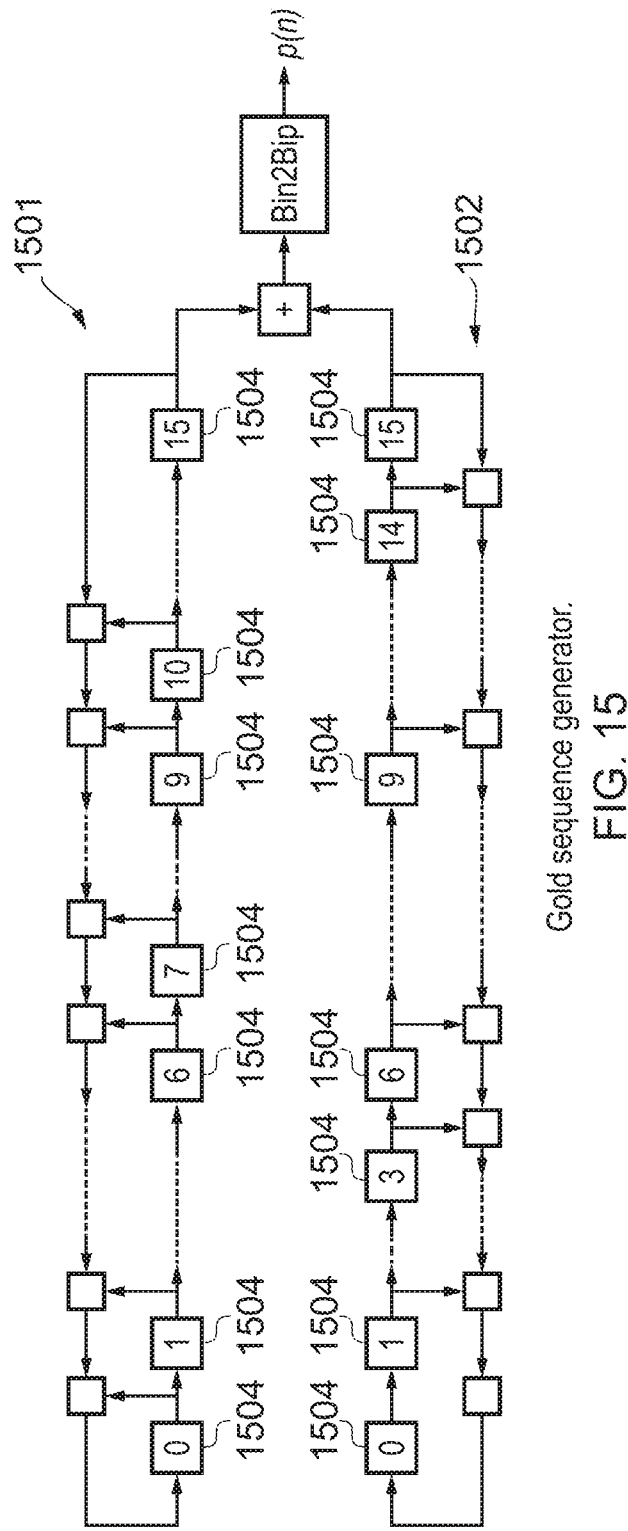
FIG. 15 is a schematic block diagram representing a Gold sequence generator whose output sequence forms part of the signature sequence used for carrying a transmitter identifier.

As shown in FIG. 15, upper and lower PRBS sequence generators 1501, 1502 each comprise a plurality of shift register stages 1504 and XOR combiners 1506 and a final XOR combiner 1508. A 'Bin2Bip' block 1510 converts the binary output of the final XOR stage into a bipolar sequence.

If each TxID requires $N_b$=16 bits for its representation each of the two shift registers are initialised with the binary version of the TxID of the particular transmitter base station. If the number of bits for TxID representation $N_b$<16 then the (16−$N_b$) least significant bits of each shift register are initialised with zero, whilst the $N_b$ most significant bits are initialised with the TxID of the broadcast transmitter. The registers are then clocked NoC times, where NoC is the number of useful OFDM subcarriers chosen for the TxID symbol or the length of the ZC sequence.

The ZC sequence $z_q(n)$ is defined as:

$$z_q(n) = e^{-j\pi q \frac{n(n+1)}{NoC}}$$

The value for q is known as the root of the ZC sequence and it is desirable for it to be mutually prime with the value for NoC. The value q=13 is mutually prime to all the ideal NoC values. Therefore q=13 whilst NoC is one of {6529, 13057, 26113} according to whether the FFT size of the preamble symbols is 8K, 16K or 32K respectively.

Detection of Bootstrap Based TxID

Figure 16:
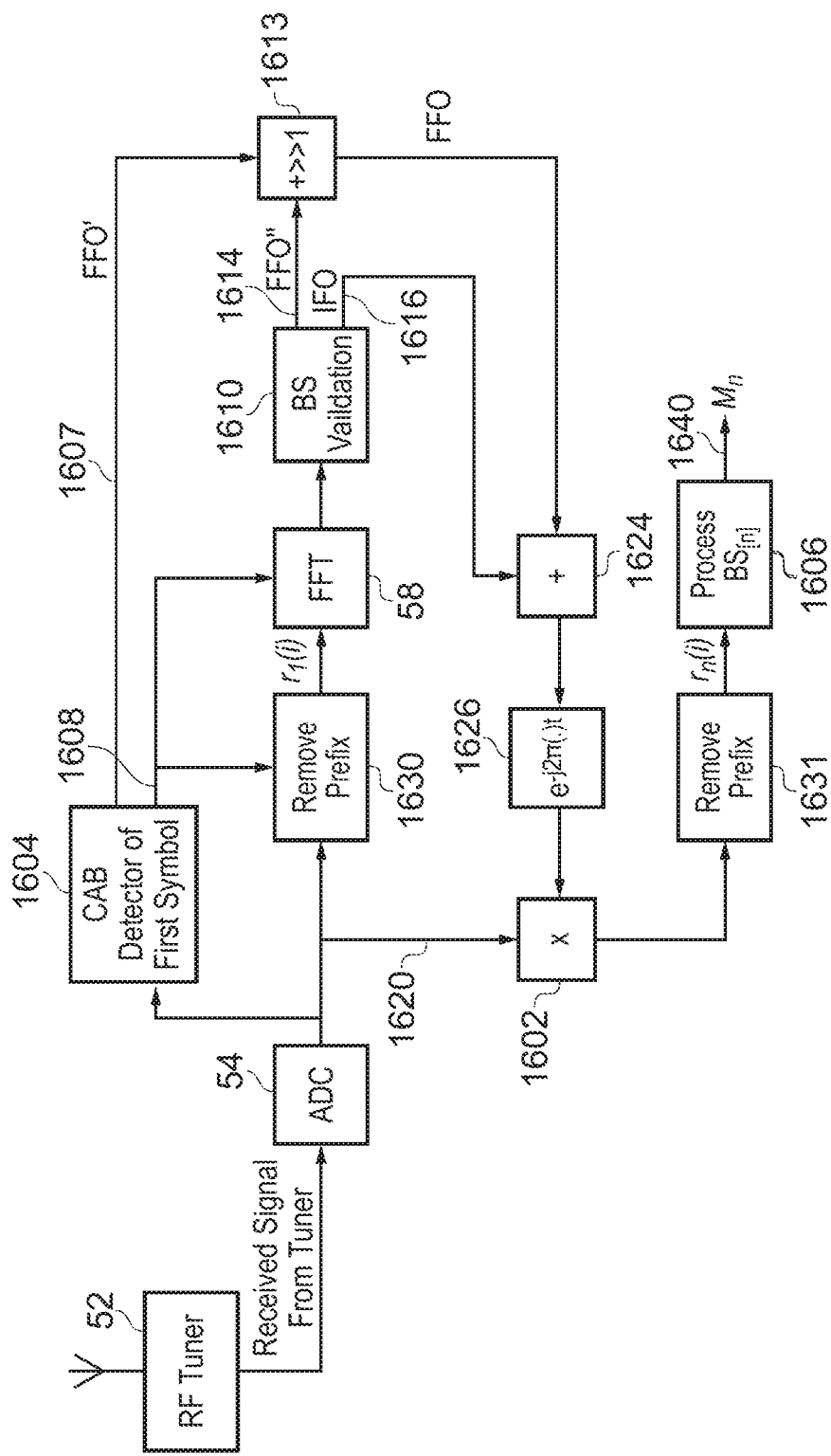
FIG. 16 is a schematic block diagram of an example receiver for detecting the first bootstrap OFDM symbol and which includes a combined bootstrap signal processor for recovering signalling information according to the present technique.

As way of background explanation methods for detection and decoding of the frame signalling bootstrap symbols are described in our co-pending patent application [2]. A simplified receiver for generally detecting signalling information from the bootstrap signal 600 is shown in FIG. 16. The top part of FIG. 16 illustrates detection and validation of the first bootstrap symbol using the C-A-B correlator. During the validation process, the integer frequency offset (IFO) is also estimated, as well as the sub-bin or fine frequency offset (FFO). These offsets are summed together and used to create a sinusoid which is multiplied with the incoming signal samples that make up the following bootstrap symbols as a means of correcting the frequency offset of the incoming signal. Then the signal is passed to a block that processes in turn each of the rest of the bootstrap symbols, estimating the cyclic shift of the symbol, which is representative of the signalling value the bootstrap symbol carries.

A schematic block diagram illustrating an adaptation of the receiver shown in FIG. 4 when operating to detect the bootstrap signal is shown in FIG. 16. As shown in FIG. 4 the signal detected by an antenna 50 is fed to an RF tuner 52 and then to an A to D converter 54. The received digitally sampled signal is then fed to a Forward Fourier Transform processor 58 after a prefix removal circuit 1630. The received digitally sampled signal is also fed to a multiplier 1602. The CAB bootstrap detector 1604 generates a timing trigger signal fed on a channel 1608 to the FFT processor 58 in order to identify a most useful part of the received signal. The timing trigger signal indicates a period of the received OFDM symbol which is transformed by the FFT processor 58 into the frequency domain, so as to capture as far as possible a maximum amount of energy of the received OFDM bootstrap symbol. This part of the signal is converted from the time to the frequency domain by the FFT processor 58 to validate the bootstrap signal and to recover the signalling information. As explained for example in our co-pending UK patent applications GB 1512949.7, GB 1512952.1, GB 1512953.9, GB 1510979.6 and GB 1512955.4 the contents of which is herein incorporated by reference the CAB bootstrap detector 1604 generates the trigger signal on channel 1607 for performing the forward Fourier transform from the first of the bootstrap signals 601. The CAB bootstrap detector 1604 also generates a first estimate of a fine frequency offset (FFO') on channel 1607. An output of the FFT processor 58 provides a frequency domain version of the received signal to a bootstrap validation processor 1610.

As shown in FIG. 16, the bootstrap validation processor 1610 generates on a first output 1614 a second and more refined estimate of the fine frequency offset (FFO"), which is a frequency shift smaller than the OFDM symbol sub-carrier spacing and which may have occurred during the transmission of the bootstrap OFDM symbol. On a second output channel 1616 the bootstrap validation processor 1610 generates an estimate of an integer frequency offset (IFO).

The receiver shown in FIG. 16 also includes a bootstrap processor 1606 for detecting and recovering signalling information from the following bootstrap symbols. However before input to the bootstrap processor 1606, a total frequency offset is removed from the signal samples that comprise the bootstrap symbols by a multiplier 1602.

The multiplier 1602 receives on a first input 1620 the received sampled signal from the AD converter 54 and on a second input 1622 samples of a sinusoid of frequency equal to the negative of a total frequency offset generated by a tone generator 1626. The total frequency offset is formed by the adder 1624 from at least one of the fine frequency offset (FFO) and the integer frequency offset (IFO) estimated by the bootstrap validation processor 1610. This total frequency offset is input into the tone generator 1626 causing it to generate a sinusoidal tone at a frequency equal to the negative of the total frequency offset. The bootstrap validation processor 1610 generates the IFO by correlating the frequency domain sub-carriers with a re-generated version of the signature sequence generated from the ZC sequence modulated with the PN sequence. The location of a peak of the correlation output is then used to estimate the TO, which is a displacement in the frequency domain of a number of sub-carriers with respect to a frequency reference within the frequency band of the bootstrap signal. Thus the total frequency offset is estimated and removed by the multiplier 1602 and the tone generator 1626 from the FFO estimated by the bootstrap validation processor 1610. The CAB detector also provides an estimate of the FFO on channel 1617. This is formed by combining the first FFO estimate FFO' output from the CAB bootstrap detector 1604 with the second estimate of the FFO, FFO" output from the bootstrap validation processor 1610 by taking the average of the two estimates in the averager 1613.

After the total frequency offset has been removed from the received sampled signal, a useful part of the received signal is isolated by the prefix remover 1631 using the synchronisation and timing signal generated by the CAB detector for both the received sampled signal fed to the FFT processor 58 and the bootstrap signal processor 1606.

According to another implementation, the signalling information carried by the bootstrap OFDM symbol could include a transmitter identifier (TxID), which is carried as a cyclic shift of the bootstrap OFDM symbol.

Figure 17:
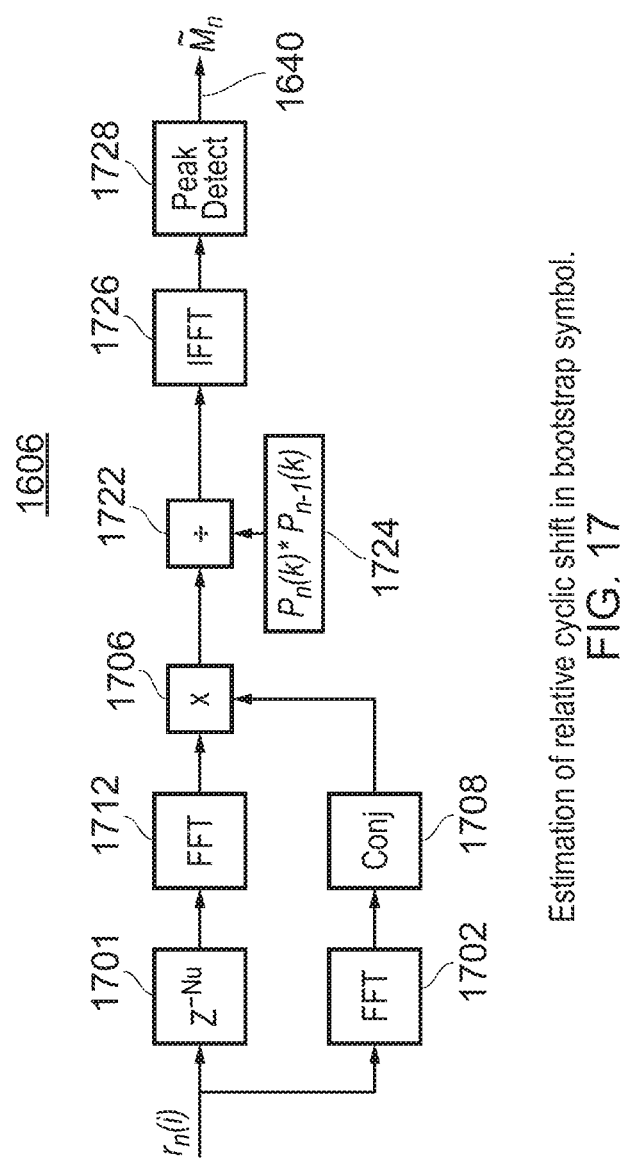
FIG. 17 is a schematic block diagram of parts of a bootstrap processor/decoder illustrated in FIG. 16 which is configured to estimate the cyclic shift applied to the bootstrap symbol as a representation of the signalling carried by the bootstrap symbol to detect a transmitter identifier in accordance with the present technique.

Since the frequency offset is corrected prior to decoding of the following bootstrap symbols, the decoding of a bootstrap symbol carrying a TxID takes place on a signal relatively free of frequency offsets. This improves the performance of the detector. In an SFN, each transmitting station emits the TxID bootstrap symbol imprinted with its own TxID. At the receiver, the signals from all broadcast transmitters within range of the receiver are superposed on each other. The receiver could potentially see a TxID bootstrap symbol carrying many TxIDs, that is those of all the transmitter base stations close enough or with favourable propagation conditions to the receiver location. FIG. 17 presents an example block diagram of the bootstrap signal processor 1606, which detects the relative cyclic shift that is used to encode the value of the signal conveyed by bootstrap symbol n, (n>0).

As shown in FIG. 17, the received sampled signal, from which the prefix has been removed at the output of the prefix remover 1630 is delayed by Nu samples by a delay unit 1701. On a parallel branch the received sampled signal is fed to an FFT processor 1702. The frequency domain received signal is fed to a first input 1704 of a multiplier 1706 after each complex sample is conjugated by a conjugation unit 1708. A second input 1710 of the multiplier 1706 receives the output of a second FFT processor 1712. The multiplier 1706 forms at its output a dot product of the conjugated frequency domain samples of bootstrap symbol n and frequency domain samples of bootstrap symbol n-1, n=1, 2 . . . . A divider 1720 divides the signal output from the multiplier 1706 by a dot product of the PN sequences used to form bootstrap symbols n and n-1, n=1, 2 . . . formed by a circuit 1724 which forms the product $P_n(k)*P_{n-1}(k)$. The divided signal is then transformed into the time domain by the IFFT processor 1726.

Figure 18:
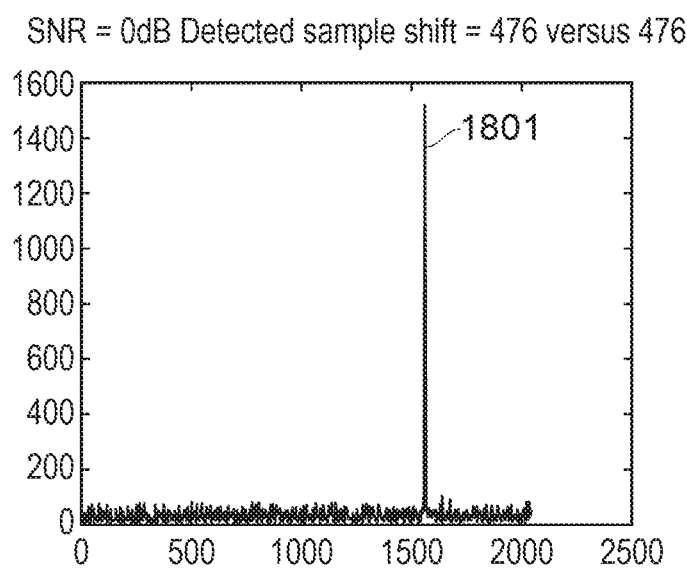
FIG. 18 is a representation of a graphical plot of amplitude against sample number for which the sample number of the peak sample represents the cyclic shift applied to the bootstrap symbol at the transmitter in accordance with the signalling being transmitted.

One signalling bootstrap symbol typically carries a value encoded as a cyclic shift on the bootstrap symbol concerned. In FIG. 17, this cyclic shift is detected by a peak detector 1728, which detects the sample number of the peak sample at the output of the IFFT processor 1726. FIG. 18 shows a typical plot of the IFFT output in which the peak sample 1801 is clearly evident. The peak sample number which represents the cyclic shift value which is an $N_b^n$ bit number $$\tilde{M}_n = \sum_{k=0}^{N_b^n - 1} d_k 2^k$$

can be decoded into the transmitted value in the following procedure where:

$N_b^n$—the number of bits carried in bootstrap symbol n is known

Convert $\tilde{M}_n$ into a bit vector $d=(d_0, d_1, d_2, \ldots, d_{11})$

Desired decoded bit vector $$b = (b_0, b_1, b_2, \ldots b_{N_b^n} - 1)$$

Extract b from d using the following equation:

$$b_i = \begin{cases} d_{10} & i = 0 \\ d_{11} \oplus d_{10-i} & 1 \leq i < N_b^n \\ 0 & N_b^n \leq i < 11 \end{cases}$$

Figure 19:
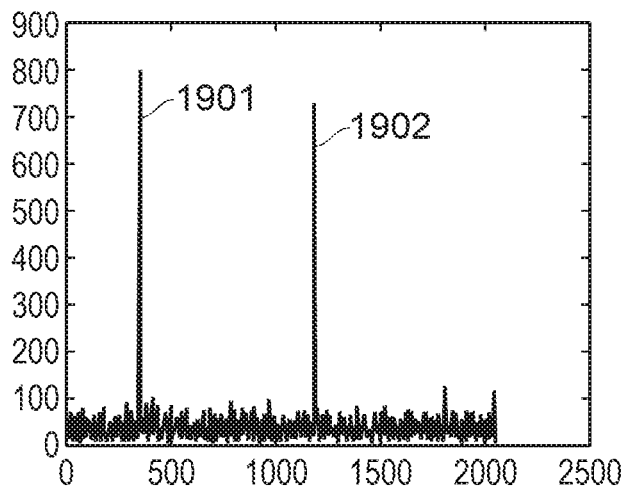
FIG. 19 is a representation of a second example of a graphical plot of amplitude against sample number for which the sample number of each peak sample represents the transmitter identifier represented by a cyclic shift applied by each of the transmitters contributing to the power of the two superposed signals to the bootstrap symbol at the transmitter in accordance with the transmitter identifier transmitted in the bootstrap signal by each of the superposing transmitters.

In a single frequency network (SFN), each broadcast transmitter encodes its TxID as a distinct signal on its TxID bootstrap symbol. However, at a given reception location in an SFN, the signals from all the broadcast transmitters enjoying favourable propagation to the receiver would combine. This means that the TxID bootstrap symbols arriving the receiver from the different transmitters would combine. The TxID bootstrap symbol at the receiver would therefore look like it has been imprinted with many values. Thus at the output of the IFFT of FIG. 17, it would be possible to see as many peaks as there are TxID broadcast transmitters in-range. FIG. 19 is an illustration of a sample IFFT output in which two TxIDs are detected from two peak samples 1901, 1902 for two broadcast transmitters transmitting the TxID bootstrap symbol, but with two different transmitter identifiers. Since there is more than one peak, all the substantive peaks have to be selected and their relative cyclic shifts (their sample numbers) used to decode the actual TxIDs of the relevant transmitter station.

The peak detector 1728 can select each of the peaks 1901, 1902 using various means. In one embodiment the peak detector includes a centre-clipper in which a clipping level C is calculated and used to clip the signal. Thus, from the IFFT output signal x(i) i=0, 1, 2, . . . 2047 the clipped signal $\hat{x}$ is derived as:

$$\hat{x}(i) = \begin{cases} |x(i)| - C & \text{if } |x(i)| - C \geq 0 \\ 0 & \text{if } |x(i)| - C < 0 \end{cases}$$

The effect of centre-clipping is thus be to set all sample amplitudes below C to zero thereby maintaining only the samples which are significant peaks of the original signal. If C is carefully chosen to lie above the noise level of the signal or above the amplitude level of all samples that are not genuine peaks, then only the peak samples would be non-zero after clipping.

In one embodiment, C is calculated as follows:

$$C = \beta * \sqrt[2]{\frac{1}{N} \sum_{i=0}^{N-1} |x(i)|^2}$$

i.e. a β scaled root mean square (RMS) value of the IFFT output signal. The scale factor β can be determined experimentally and its value determines the dynamic range of the detector i.e. strongest detectable power versus weakest detectable signal at the receiver.

In yet another embodiment, the highest peak amplitude $A_{max}$ of the IFFT output signal is detected. C is then calculated as a fraction $\propto$ of $A_{max}$. Thus:

$$C = \propto * A_{max}$$

The fraction $\alpha$ is set according to the dynamic range required of the TxID detector. Thus for a dynamic range of D dB, set $$\propto \; = 10^{-\frac{D}{20}}.$$

Detection of Special OFDM Symbol Based on TXID

Figure 20:
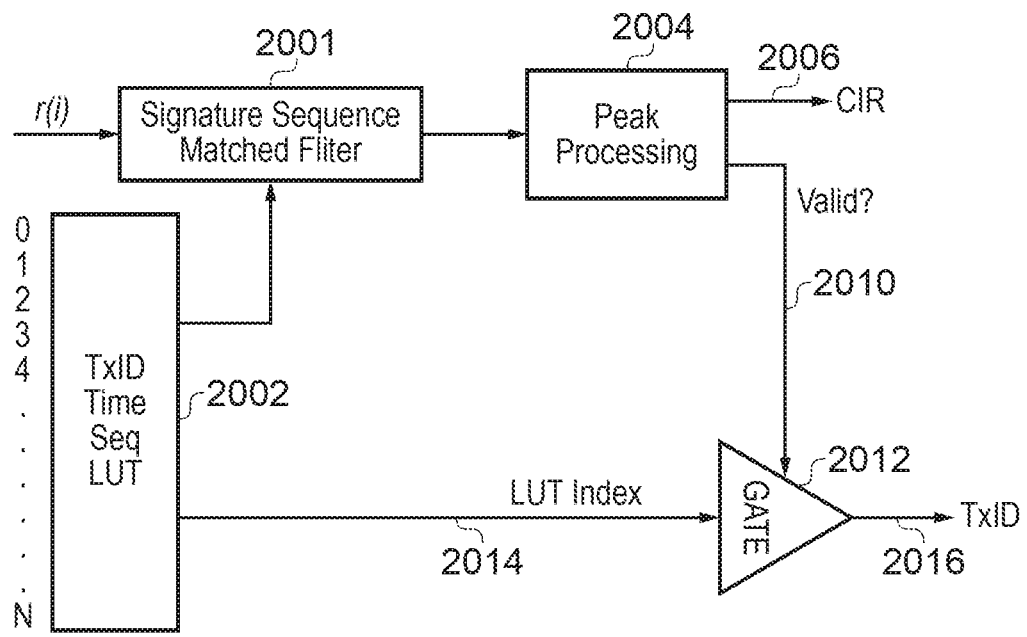
FIG. 20 is a schematic block diagram of part of a receiver for detecting a transmitter identifier represented by a signature sequence carried by one or more OFDM symbols of a preamble signal in the time domain.

As explained above, according to one example embodiment the TxID can be conveyed by an OFDM symbol 1301 modulated by a signature sequence in the frequency domain. In general, the spectrum of a ZC sequence is also a ZC sequence and vice versa. This means that the TxID OFDM symbol can be detected both in the time domain and in the frequency domain. FIG. 20 provides an example illustration of a receiver adapted to detect a TxID in a received signal in the time domain, whereas FIG. 21 provides an example illustration of a receiver adapted to detect a TxID in the frequency domain.

As shown in FIG. 20, according to one example embodiment of a receiver performing time domain detection, the TxID OFDM symbol 1301 can be detected by use of a finite impulse response (FIR) filter 2001 whose impulse response is matched to the IFFT of the modulating signature sequence. To find all the TxIDs in the received signal, the filter response will be matched to the IFFT of each of the possible TxID signature sequences in turn. These are provided from a TxID time sequence Look UP Table 2002. In each case, the presence of substantive peaks at the output of the matched filter 2001 will confirm the presence of the TxID represented by the matching signature sequence. For each TxID found, the output of the filter 2001 can also be post-processed, using a peak processor 2004. The peak processor 2004 can for example include a centre-clipper to expose significant peaks which together would give an estimated channel impulse response (CIR) at an output channel 2006 from the particular transmitter to the receiver. The peak processor 2004 also presents at a second output channel 2008 a signal indicating a positive detection, which is applied to a control input 2010 of a gate 2012 to latch an identifier of a TxID presented at an input 2014 and corresponding to a number of a currently selected time domain sequence which was fed to the FIR filter 2001 to produce the positive detection. The gate 2012 therefore forms at an output 2016 an indication of the TxID.

Figure 21:
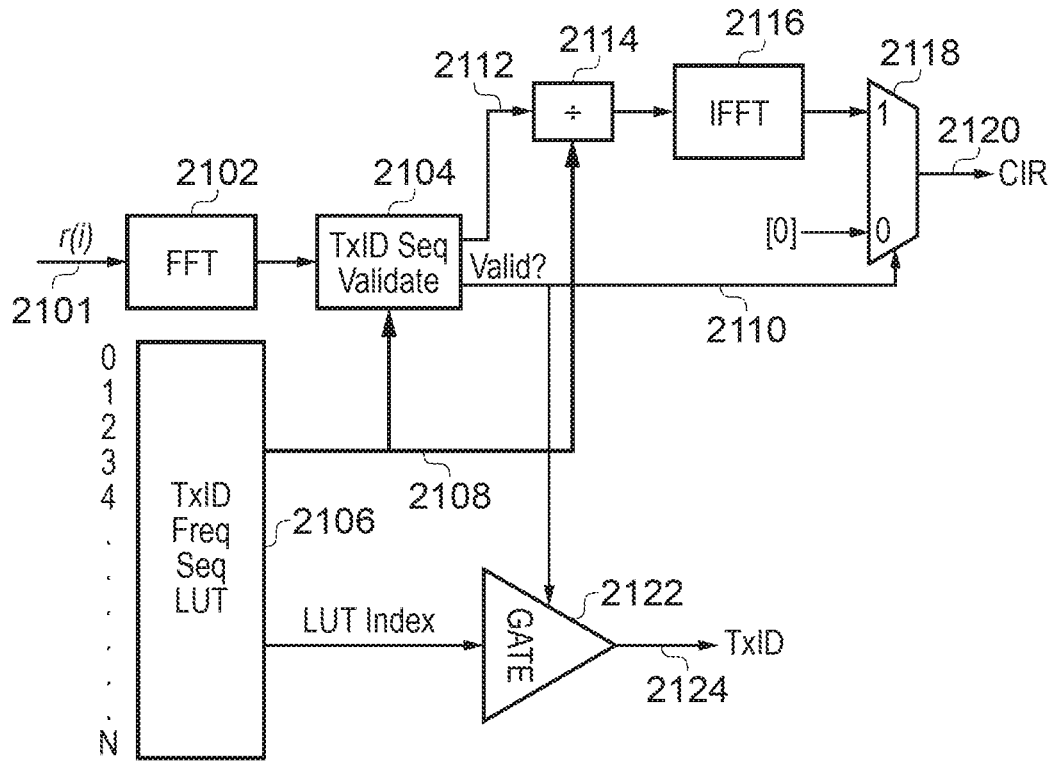
FIG. 21 is a schematic block diagram of part of a receiver for detecting a transmitter identifier represented by a signature sequence carried by one or more OFDM symbols of a preamble signal in the frequency domain.

An example of a receiver which is configured to detect the TxID from the OFDM symbol 1301 in the frequency domain is shown in FIG. 21. In FIG. 21 the receiver receives a down converted and sampled digital signal on an input channel 2101 at an FFT processor 2102. The FFT window is determined by prior synchronisation processes such as counting out the samples of the TxID OFDM symbol guard interval since the end of the last bootstrap symbol or preamble symbol. The received signal is transformed into the frequency domain by a forward Fourier transform applied by the FFT processor 2102 and fed to a TxID validate block 2104. The TxID validate block 2104 can detect the presence of a particular TxID modulating signature sequence by cross-correlating the received symbol spectrum with all the modulating signature sequences in turn and detecting a cross-correlation peak. To this end, the receiver includes a TxID frequency domain Look Up Table 2106, which provides a frequency domain version of each of the possible signature sequences representing each of the possible TxIDs which could have been selected at the transmitter. The TxID validate block 2104 therefore receives in turn each of the frequency domain signature sequences via a channel 2108. The TxID validate block 2104 cross-correlates each frequency domain signature sequence with the frequency domain received signal. Once a peak is found, the TxID validate block generates a validate output signal on a channel 2110 and on a second output channel 2112 the received signal component of the OFDM symbol carrying the signature sequence in the frequency domain is fed to a divider unit 2114. At the output of the divider unit 2114 a representation the channel transfer function from the transmitter to the receiver is formed, which is then transformed into the time domain by and IFFT processor 2116 by performing a reverse Fourier transform to form the channel impulse response. That is to say the channel impulse response is estimated by dividing the received symbol spectrum by the signature sequence and then taking the IFFT of the result—thus:

$$h(i) = \sum_{k=0}^{N-1} \frac{R(k)}{C_m(k)} e^{j2\pi i k}$$

where R(k), $C_m$(k) are respectively the spectrum of the received TxID symbol and the TxID signature sequence for transmitting station m and N is the length of FFT size of the TxID symbol. A selecting block 2118 is used to feed the channel impulse response to an output 2120 if a positive validation signal is presented at a control input 2110. In parallel, the positive detection signal is fed from the channel 2110 to a control input of a gate 2122, which latches an indication of the LUT index representing the detected TxID to an output 2124.

Further embodiments below have been described in UK patent application 1312048.0 filed on 4 Jul. 2013, publication number GB2515801 which has incorporated into this disclosure in its entirety by reference.

As disclosed in the Applicant's co-pending UK patent application 1305795.5, as well as utilising the signature sequence for the provision of a CTR (Channel Impulse Response) and fine preamble symbol timing in harsh radio environments, the choice of signature sequence may also be used to convey information or a message. For instance, by selecting a signature sequence from a set of signature sequences the selection of the signature sequence may convey information, such as an indication of a presence of an absence of an active early warning signal (EWS) within the signalling data or payload. This indication may be received at the receiver by detecting which signature sequence from the set of possible signature sequences has been combined with the signalling data.

Figure 22:
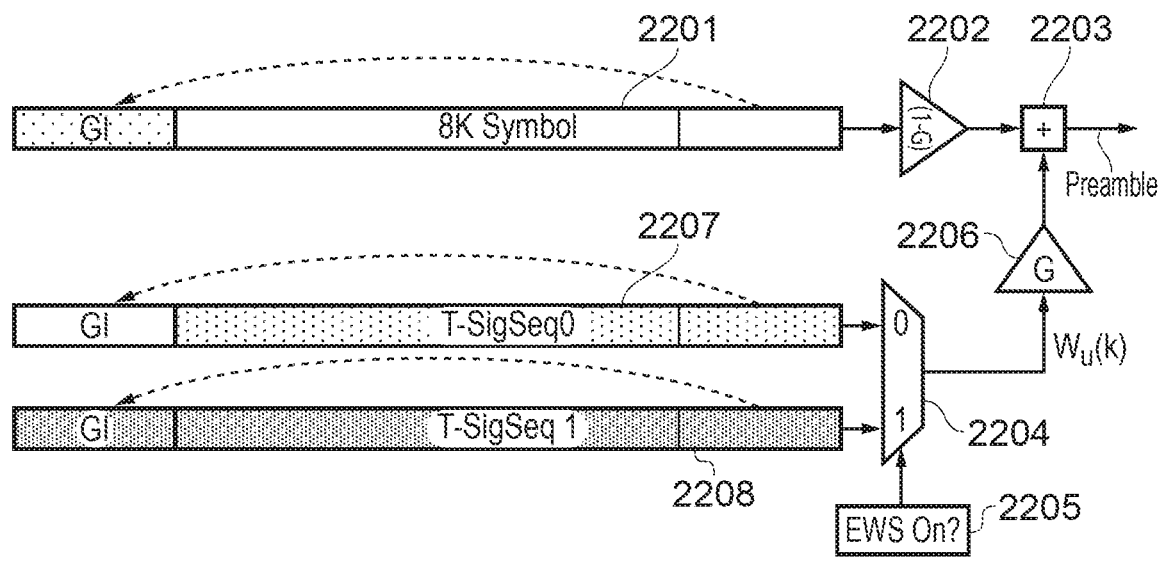
FIG. 22 is a schematic diagram of signature sequence insertion elements of a transmitter when the signature sequence insertion is performed in the time domain.

FIG. 22 provides a schematic diagram of signature sequence insertion elements of a transmitter when the signature sequence insertion is performed in the time domain according to the operation disclosed in the Applicants co-pending UK patent application 1305795.5. The signalling OFDM symbol has been transformed into the time domain to form the symbol 2201. The symbol 2201 is then scaled by the scaling factor (1-G) by a time domain scalar or multiplier 2202. The scaled signal is then added or combined to a time domain signature sequence signal by the adder or combiner 2203. A multiplexer 2204 under the control of a EWS signal supplied by an EWS unit 2205 is utilised to supply the different signature sequences to the scalar or multiplier 2206 which scales the signature sequence by G. Depending on the presence of a EWS signal, either the time domain signature sequence represented by 2207 (EWS Off) or 2208 (EWS On) is combined with the signalling symbol 2201 to form the final time domain preamble. As shown in FIG. 22, the time domain signature sequences and signalling data have a conventional cyclic prefix or guard interval introduced prior to combining and therefore a dedicated guard interval unit is not required after the signature sequence has been combined with the signalling symbol. However, a time domain guard interval processor may therefore be required prior to the combiner in order to introduce a guard interval in the signalling symbol and the signature sequences prior to combining.

Figure 23:
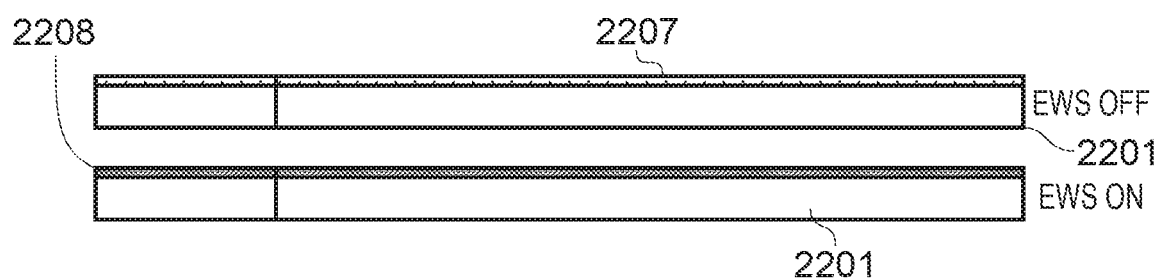
FIG. 23 is a schematic illustration of the preamble in the time domain once the signalling data symbol has been combined with a signature sequence by transmitter elements of FIG. 10.

FIG. 23 provides a schematic illustration of the preamble in the time domain once the signalling data symbol has been combined with a signature sequence by transmitter elements of FIG. 10. In FIG. 23 G<1 and therefore the signature sequence is at a significantly lower power than the signalling data.

Figure 24:
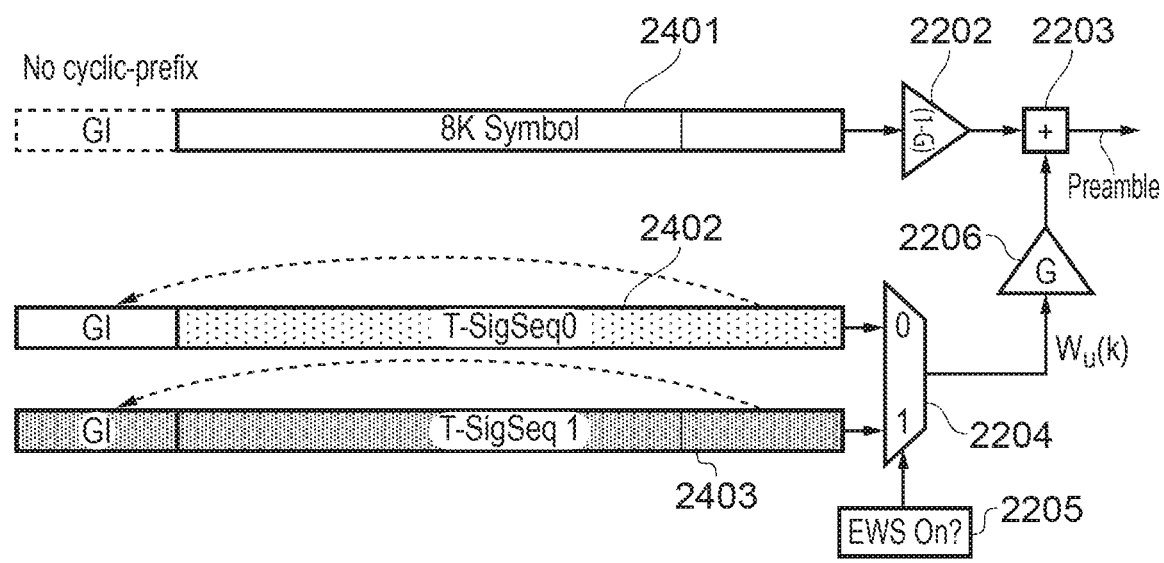
FIG. 24 is a schematic diagram of the equivalent time domain processing in a transmitter in accordance with an embodiment of present technique.

FIG. 24 provides a schematic diagram of the equivalent time domain processing in a transmitter in accordance with an embodiment of present technique. The elements of the transmitter of FIG. 24 are substantially similar to those of FIG. 22, however, the signals and symbols which they combine differ. Time domain signalling data symbol 2401 no longer includes a guard interval. Instead a guard interval is provided by the signature sequence which is to be combined with the signalling data symbol to form a preamble. As can be seen in FIG. 24, the guard interval of the signature sequences is formed as a cyclic prefix by replicating an end portion of the respective signature sequence and placing it at the front of the signature sequence. When an indication of an EWS is to be transmitted, the signature sequence signal 2403 is combined with the signalling symbol 2401 and when an indication of an EWS is not to be transmitted, the signature sequence signal 2402 is combined with the signalling symbol 2401. A consequence of this new arrangement of the guard interval and signature sequences is that an indication of which signature has been combined with the signalling data symbol is present in the guard interval. Consequently only the fraction of the signature sequence in the guard interval is required to be detected in order to establish which signature sequence from a set of signature sequences has been combined with signalling symbol. Although the above described embodiment has been described with regard to EWS, the message conveyed by the selection of signature sequence and therefore the guard interval may be of any appropriate sort, for instance an automatic start-up command or an indication that software updates are to be transmitted.

Figure 25:
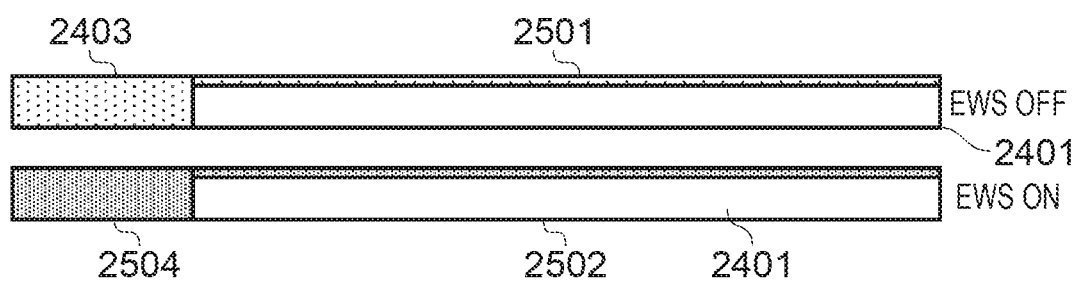
FIG. 25 is an illustration of the preamble formed by the transmitter of FIG. 24 when an EWS-off signature sequence is transmitted 2501 and when an EWS-on signature sequence is transmitted 2502.

FIG. 25 provides an illustration of the preamble formed by the transmitter of FIG. 24 when an EWS-off signature sequence is transmitted 2501 and when an EWS-on signature sequence is transmitted 2502. It can be seen that the guard intervals 2503 and 2504 of the preambles are formed from a portion of the signature sequence as opposed the signalling data as is the case in the transmitter described with reference to FIG. 22.

Figure 26:
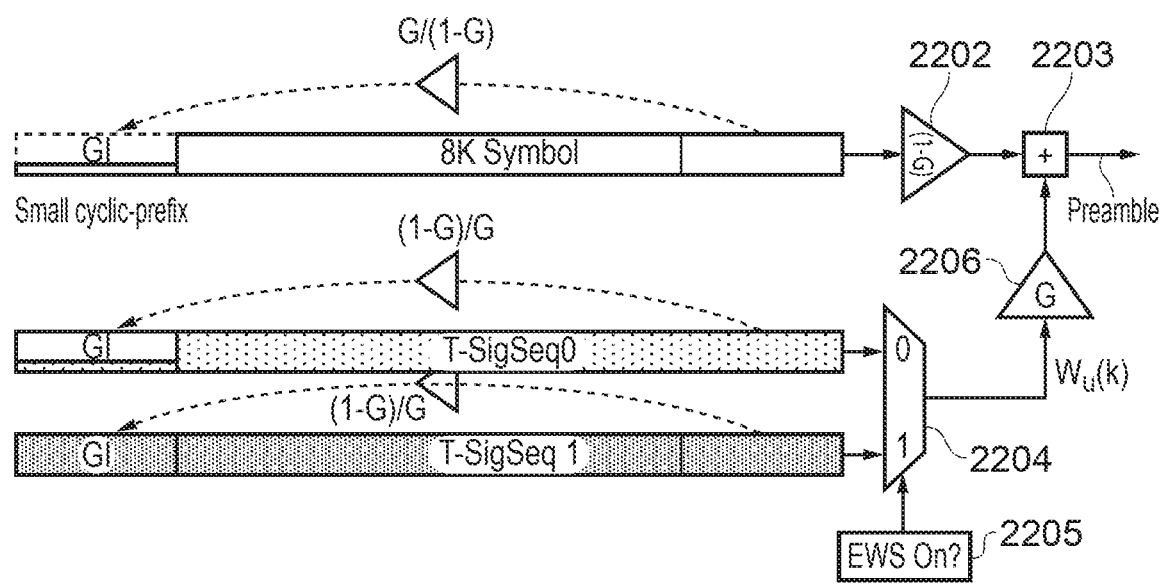
FIG. 26 is a schematic diagram of a time domain functional view of the transmitter in accordance with an example embodiment.

FIG. 26 provides a schematic diagram of a time domain functional view of the transmitter in accordance with an example embodiment. The structure of this functional view of the transmitter is substantially similar to that illustrated in FIG. 24 but the signals that are combined differ. In a previous embodiment the guard interval of the preamble was completely formed from a portion of the chosen signature sequence. However, in this embodiment the guard interval is formed from both a portion of the signature sequence and the signalling symbol, where the signalling symbol in the guard interval is at a lower amplitude [(G/1−G)] compared to the portion of signature sequence [(1−G)/G]. In some existing OFDM systems, a cyclic prefix or guard interval is formed from a portion of the useful symbol and so a slight misplacement of the FFT window due to inaccurate timing information does not significantly impact upon the decoding accuracy of the data contained in the FFT window. This robustness arises because any portion of the signalling cut off from the end of the symbol is also contained in the guard interval and therefore will still be captured by the misplaced FFT window. However, in the previous embodiment functionally illustrated in FIGS. 24 and 25, misplacement of the FFT window may result in inter-carrier interference (ICI) amongst the data sub-carriers of the signalling OFDM symbol thereby degrading decoding accuracy because a portion of the signalling OFDM symbol is no longer repeated in the guard interval. Consequently, in the present embodiment, by introducing a portion of the signalling OFDM symbol into the guard interval the adverse effects of FFT window misplacement can be reduced. Although the amplitude of the signalling OFDM symbol in the guard interval is comparatively low, it has been shown that this improves a decoding accuracy of the signalling OFDM symbol. Furthermore, the low amplitude of the guard interval signalling data, allows the differential guard interval matched filtering of the received signal to be unaffected by the samples of the signalling OFDM symbol, thus maintaining the receiver's ability to detect which signature sequence has been transmitted and the associated message indicator.

Figure 27:
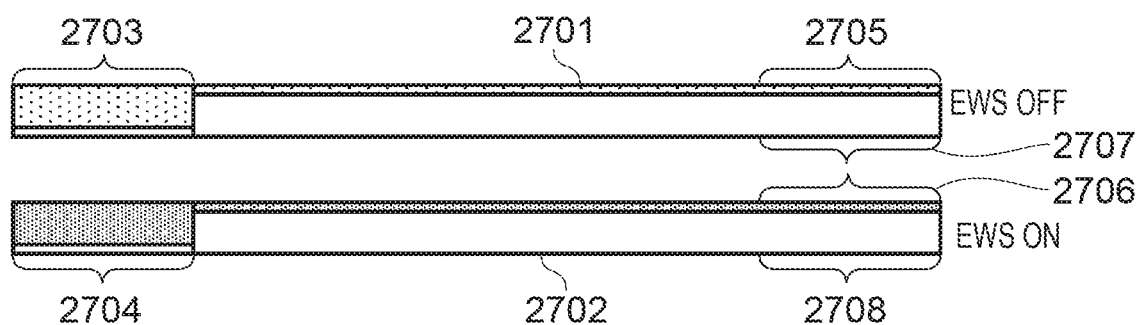
FIG. 27 is an illustration of preambles that may be formed by the transmitter of FIG. 26 when the message conveyed by the signature sequence selection is the presence or absence of a EWS.

FIG. 27 provides an illustration of preambles that may be formed by the transmitter of FIG. 26 when the message conveyed by the signature sequence selection is the presence or absence of a EWS. As can be seen from FIG. 27, the preambles 2701 and 2702 each include a guard period 2703 and 2704 which are formed primarily from portions of the signature sequences 2705, 2706 but also from portions of the signalling OFDM symbol 2707, 2708. In some examples, the signalling OFDM symbol portion of the guard interval may have an amplitude of −10 dB compared to the signature sequence and the signature sequence and signalling OFDM symbol may be formed from 8 k OFDM symbols which have approximately 6912 useful subcarriers. Furthermore, the guard interval may be 57/128 of 8192 samples in length, therefore having a length of 3648 samples. Although these parameters are suitable for 8 k OFDM symbol, the parameters are merely example parameters and may vary depending on other characteristics of system, for example the separation between transmitters and the required capacity of the system.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

[1] ATSC Candidate Standard: System Discovery and Signalling (Doc. A/321 Part 1), Document S32-231r4, 6 May 2015
[2] EN 302 755 V1.3.1, Frame structure channel coding and modulation for a second generation digital terrestrial television broadcasting system (DVB-T2), April 2012
[3] WO2014/155104
[4] ATSC Candidate Standard: Physical Layer Protocol (Doc. A/322), Advanced Television Systems Committee, Jan. 18, 2016.
[5] WO2014/155063
[6] GB 1512949.7
[7] GB 1512952.1
[8] GB 1512953.9
[9] GB 1510979.6
[10] GB 1512955.4

The invention claimed is:

1. A receiver, comprising:
processing circuitry configured to
detect presence of a signature sequence representing a transmitter identifier from a received signal, the received signal being configured in a plurality of frames, a frame of the plurality of frames comprising bootstrap symbols, first Orthogonal Frequency Division Multiplexed (OFDM) symbols each being modulated with signalling information, and second OFDM symbols being modulated with payload data, the signature sequence having been included in a first of the first OFDM symbols in time located immediately after all of the bootstrap symbols and before one or more preamble symbols for the frame, and the signature sequence being present on only selected frames intermittently arranged among the plurality of frames for conservation of transmission power or capacity; and
output the transmitter identifier when the presence of the signature sequence is detected.

2. The receiver according to claim 1, wherein the processing circuitry is configured to:
detect ATSC signalling information from the first OFDM symbols; and
recover payload information from the second OFDM symbols using the ATSC signalling information.

3. The receiver according to claim 2, wherein the first OFDM symbols are ATSC preamble symbols.

4. The receiver according to claim 1, wherein
the first of the first OFDM symbols includes a guard interval formed from a portion of a useful part for the first of the first OFDM symbols, and
the guard interval has been injected with a portion of the signature sequence.

5. The receiver according to claim 1, wherein the processing circuitry is configured to:
convert the received signal into a time domain representation; and
detect the signature sequence located in the received signal immediately after a bootstrap symbol of inverted phase.

6. The receiver according to claim 1, wherein the processing circuitry is configured to perform a synchronization process using a first one of the bootstrap symbols in time of the frame.

7. The receiver according to claim 1, wherein the processing circuitry is configured to:
select a signal from one or more received signals according to one or more detected transmitter identifiers that correspond to the one or more received signals, respectively.

8. The receiver according to claim 1, wherein the processing circuitry is configured to detect a Fast Fourier Transform size (FFT) OFDM symbol as the first of the first OFDM symbols in time located immediately after all of the bootstrap symbols for the frame, the FFT OFDM symbol having been injected with the signature sequence, the signature sequence having a predetermined length.

9. The receiver according to claim 8, wherein the first OFDM symbols are ATSC preamble symbols.

10. The receiver according to claim 8, wherein the FFT OFDM symbol is an 8K size FFT OFDM symbol.

11. The receiver according to claim 1, wherein the signature sequence in the first of the first OFDM symbols has a lower injection power level than a power level of the signalling information modulated with the first OFDM symbols.

12. The receiver according to claim 1, wherein the signature sequence representing the transmitter identifier comprises a Gold code sequence produced by an initialization value to a shift register of a binary value identifying a transmitter.

13. The receiver according to claim 1, wherein the processing circuitry is further configured to:
correlate frequency domain representations of signature sequences representing various transmitter identifiers with a frequency domain representation of the received signal to obtain a correlation result; and
select one of the transmitter identifiers for output according to a peak in the correlation result.

14. The receiver according to claim 13, wherein
the receiver further comprises a memory, and
the frequency domain representations of the signature sequences or the signature sequences are stored in the memory of the receiver.

15. The receiver according to claim 1, wherein the processing circuitry is further configured to:
correlate frequency domain representations of signature sequences representing various transmitter identifiers with a frequency domain representation of the received signal to obtain a correlation result; and
select multiple transmitter identifiers of the transmitter identifiers for output according to multiple peaks in the correlation result.

16. The receiver according to claim 1, wherein a baseband sampling rate of the signature sequence is similar to that of the first OFDM symbols.

17. A mobile television receiver comprising the receiver according to claim 1, wherein the processing circuitry is further configured to detect multiple different transmitter identifiers from multiple received signals and to triangulate a position of the mobile television receiver according to the detected multiple transmitter identifiers.

18. A television receiver comprising a display and the receiver according to claim 1.

19. A receiver comprising:
   a non-transitory data storage medium having stored thereon signature sequences representing multiple transmitter identifiers, the signature sequences being Gold code sequences produced by initialising two shift registers defined by two polynomials, the outputs of which have been XORed together, with binary values representing ATSC transmitters; and
   circuitry configured to use the stored signature sequences to identify one or more transmitter identifiers from a received signal according to one or more signature sequences included in the received signal, the received signal being configured in a plurality of frames, a frame of the plurality of frames comprising bootstrap symbols, first Orthogonal Frequency Division Multiplexed (OFDM) symbols each being modulated with signalling information, and second OFDM symbols being modulated with payload data, the one or more signature sequence having been included in a first of the first OFDM symbols in time located immediately after all of the bootstrap symbols and before one or more preamble symbols for the frame, and the one or more signature sequence being present on only selected frames intermittently arranged among the plurality of frames for conservation of transmission power or capacity.

20. The receiver according to claim 19, wherein the circuitry is further configured to:
   correlate frequency domain representations of the signature sequences with a frequency domain representation of the received signal to obtain a correlation result; and
   select one of the transmitter identifiers for output according to a peak in the correlation result.

21. A method, comprising:
   detecting, by circuitry, presence of a signature sequence representing a transmitter identifier from a received signal, the received signal being configured in a plurality of frames, a frame of the plurality of frames comprising bootstrap symbols, first Orthogonal Frequency Division Multiplexed (OFDM) symbols each being modulated with signalling information, and second OFDM symbols being modulated with payload data, the signature sequence having been included in a first of the first OFDM symbols in time located immediately after all of the bootstrap symbols and before one or more preamble symbols for the frame, and the signature sequence being present on only selected frames intermittently arranged among the plurality of frames for conservation of transmission power or capacity; and
   outputting the transmitter identifier when the presence of the signature sequence is detected.

22. The method claimed in claim 21, wherein
   the signature sequence in the first of the first OFDM symbols has a lower injection power level than a power level of the signalling information modulated with the first OFDM symbols.

23. The method claimed in claim 21, further comprising:
   correlating frequency domain representations of signature sequences representing various transmitter identifiers with a frequency domain representation of the received signal to obtain a correlation result; and
   selecting one of the transmitter identifiers for output according to a peak in the correlation result.

24. The receiver according to claim 1, wherein the processing circuitry is further configured to:
   derive a channel impulse response associated with a transmitter identified by the transmitter identifier according to a portion of the received signal in which the signature sequence representing the transmitter identifier is detected.

* * * * *